US009407459B2

(12) United States Patent
Okuno et al.

(10) Patent No.: US 9,407,459 B2
(45) Date of Patent: Aug. 2, 2016

(54) COMMUNICATION APPARATUS, COMMUNICATION SYSTEM, AND COMMUNICATION METHOD TO TRANSMIT AND RECEIVE ETHERNET FRAMES

(71) Applicant: HITACHI, LTD., Tokyo (JP)

(72) Inventors: Michitaka Okuno, Tokyo (JP); Takashi Yokoyama, Tokyo (JP); Kozo Ikegami, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 28 days.

(21) Appl. No.: 14/412,500

(22) PCT Filed: Feb. 20, 2013

(86) PCT No.: PCT/JP2013/054113
§ 371 (c)(1),
(2) Date: Jan. 2, 2015

(87) PCT Pub. No.: WO2014/006926
PCT Pub. Date: Jan. 9, 2014

(65) Prior Publication Data
US 2015/0195104 A1    Jul. 9, 2015

(30) Foreign Application Priority Data

Jul. 5, 2012    (JP) .................................. 2012-151442

(51) Int. Cl.
| | | |
|---|---|---|
| H04L 12/46 | (2006.01) | |
| H04L 12/741 | (2013.01) | |
| H04L 12/931 | (2013.01) | |
| H04L 29/06 | (2006.01) | |
| H04L 12/413 | (2006.01) | |

(52) U.S. Cl.
CPC .......... *H04L 12/4675* (2013.01); *H04L 12/413* (2013.01); *H04L 12/4641* (2013.01); *H04L 12/4645* (2013.01); *H04L 45/74* (2013.01); *H04L 49/70* (2013.01); *H04L 69/08* (2013.01)

(58) Field of Classification Search
None
See application file for complete search history.

(56) References Cited

U.S. PATENT DOCUMENTS

| | | | | |
|---|---|---|---|---|
| 2006/0245438 | A1* | 11/2006 | Sajassi | .................... H04L 12/18 370/399 |
| 2010/0146074 | A1 | 6/2010 | Srinivasan | |
| 2010/0329265 | A1* | 12/2010 | Lapuh | .................. H04L 12/4645 370/395.53 |

(Continued)

FOREIGN PATENT DOCUMENTS

| | | |
|---|---|---|
| JP | 2011-211502 A | 10/2011 |
| WO | 2011/037104 A1 | 3/2011 |
| WO | 2011/049742 A2 | 4/2011 |

OTHER PUBLICATIONS

Fang et al., "The Evolution of Carrier Ethernet Services—Requirements and Deployment Case Studies", IEEE Communications Magazine, Mar. 2008, pp. 69-76.

*Primary Examiner* — Chi H Pham
*Assistant Examiner* — Soon-Dong D Hyun
(74) *Attorney, Agent, or Firm* — Mattingly & Malur, PC

(57) ABSTRACT

Upon receipt of an intercepted first Ethernet Frame, a communication system converts the first Ethernet Frame into a second Ethernet Frame including a second identifier based on the first identifier and the conversion information, and sends the second Ethernet Frame toward a first input/output port identified by the second identifier. The system, in sending an Ethernet Frame on which communication service has been executed from the virtual machine, converts the Ethernet Frame on which the communication service has been executed into a third Ethernet Frame including a third identifier identifying a second input/output port of the virtual machine which has executed the communication service. The system converts the third Ethernet Frame into the first Ethernet Frame including the first identifier based on the third identifier and the conversion information and sends the first Ethernet Frame toward the destination of the first Ethernet Frame.

18 Claims, 23 Drawing Sheets

(56) References Cited

U.S. PATENT DOCUMENTS

2011/0090911 A1 4/2011 Hao et al.
2012/0089713 A1* 4/2012 Carriere ............. H04L 12/4641
                                                                709/222
2013/0013810 A1* 1/2013 Allan ................... H04L 12/2881
                                                                709/245
2013/0308648 A1* 11/2013 Shamis ................ H04L 12/465
                                                                370/395.53

* cited by examiner

SERVICE TABLE 700

| TENANT 710 | BAND-WIDTH 711 | SERVICE 712 | SERVICE QUALITY (LATENCY) 713 | ALLOCATED CPU CORE 714 | ALLOCATED MEMORY 715 | STAG 716 | LTAG 717 | PORT 718 | APPARATUS NUMBER 719 | INFORMATION PROCESSING CARD NUMBER 720 | VM NUMBER 721 | VNIC INFORMATION 722 |
|---|---|---|---|---|---|---|---|---|---|---|---|---|
| A | 100Mbps | IPS | Severe | DEDICATED, 1 | 4GB | 0x000A | 0x001A | WAN | 1 | 1 | 1 | VMAC1, VIP1 |
| A | 100Mbps | IPS | Severe | DEDICATED, 1 | 4GB | 0x000A | 0x002A | LAN | 1 | 1 | 1 | VMAC2, VIP2 |
| A | 100Mbps | WOC | Severe | DEDICATED, 1 | 8GB | 0x000A | 0x003A | WAN | 1 | 1 | 2 | VMAC3, VIP3 |
| A | 100Mbps | WOC | Severe | DEDICATED, 1 | 8GB | 0x000A | 0x004A | LAN | 1 | 1 | 2 | VMAC4, VIP4 |
| B | 50Mbps | WOC | Severe | DEDICATED, 1 | 8GB | 0x000B | 0x005B | WAN | 1 | 1 | 3 | VMAC5, VIP5 |
| B | 50Mbps | WOC | Severe | DEDICATED, 1 | 8GB | 0x000B | 0x006B | LAN | 1 | 1 | 3 | VMAC6, VIP6 |
| B | 50Mbps | IDS | Severe | SHARED, 1 | 2GB | 0x000B | 0x007B | WAN | 1 | 1 | 4 | VMAC7, VIP7 |

REQUESTED BY TENANTS (DETERMINED BY ADMINISTRATOR) — columns 710–715

ALLOCATED BY CONTROL PROGRAM — columns 716–722

| INFORMATION PROCESSING CARD NUMBER | PHYSICAL RESOURCES | | ALLOCATED RESOURCES | | |
|---|---|---|---|---|---|
| | NUMBER OF CORES (NUMBER OF THREADS) | AMOUNT OF MEMORY | NUMBER OF DEDICATED CORES | NUMBER OF SHARED CORES | AMOUNT OF MEMORY |
| 1 | 8 | 32GB | 1 | 1 | 8GB |
| 2 | 8 | 32GB | 1 | 1 | 8GB |
| 3 | 8 | 32GB | 1 | 1 | 8GB |

| COMMUNICATION NODE APPARATUS NUMBER | UNUSED LTAG'S | NUMBER OF UNUSED LTAG'S |
|---|---|---|
| 1 | 0001, 0003, ... Y | 4087 |
| 2 | 0001, 0003, ... 4094 | 4094 |
| ... | ... | ... |

RESOURCE MANAGEMENT TABLE

*FIG. 7*

| | 703 | 40 | 41 | 50 | 51 | 52 | |
|---|---|---|---|---|---|---|---|
| | | IN TAG | IN PORT | OUT TAG | OUT PORT | SERVICE | |
| TAG CONVERSION RULES FOR TENANT A 60 | | STAG:000A | WAN | LTAG:001A | CARD#1 | FW | 762 |
| | | LTAG:002A | CARD#1 | LTAG:003A | CARD#1 | WOC | 763 |
| | | LTAG:004A | CARD#1 | STAG:000A | LAN | NONE | 764 |
| | | STAG:000A | LAN | LTAG:004A | CARD#1 | WOC | |
| | | LTAG:003A | CARD#1 | LTAG:002A | CARD#1 | FW | |
| | | LTAG:001A | CARD#1 | STAG:000A | WAN | NONE | |
| TAG CONVERSION RULES FOR TENANT B 61 | | STAG:000B | WAN | LTAG:005B<br>LTAG:007B | CARD#1<br>CARD#1 | WOC<br>IDS | 765<br>766 |
| | | LTAG:006B | CARD#1 | STAG:000B | LAN | NONE | |
| | | STAG:000B | LAN | LTAG:006B | CARD#1 | WOC | |
| | | LTAG:005B | CARD#1 | STAG:000B | WAN | NONE | |
| | | ... | ... | ... | ... | ... | |

CONVERSION TABLE

| | 40 | 41 | 50 | 51 | 52 | |
|---|---|---|---|---|---|---|
| | IN TAG | IN PORT | OUT TAG | OUT PORT | SERVICE | |
| | STAG:000A | WAN | LTAG:001A | SWITCH 15-1 | FW | 7031 |
| | LTAG:002A | SWITCH 15-1 | LTAG:003A | SWITCH 15-1 | WOC | 7032 |
| | LTAG:004A | SWITCH 15-1 | STAG:000A | LAN | NONE | 7033 |
| | STAG:000A | LAN | LTAG:004A | SWITCH 15-1 | WOC | |
| | LTAG:003A | SWITCH 15-1 | LTAG:002A | SWITCH 15-1 | FW | |
| | LTAG:001A | SWITCH 15-2 | STAG:000A | WAN | NONE | |
| | STAG:000B | WAN | LTAG:005B<br>LTAG:007B | SWITCH 15-2<br>SWITCH 15-2 | WOC<br>IDS | |
| | LTAG:006B | SWITCH 15-2 | STAG:000B | LAN | NONE | |
| | STAG:000B | LAN | LTAG:006B | SWITCH 15-2 | WOC | |
| | LTAG:005B | SWITCH 15-2 | STAG:000B | WAN | NONE | |
| | ... | ... | ... | ... | ... | |

CONVERSION TABLE

FIG. 20

COMMUNICATION APPARATUS, COMMUNICATION SYSTEM, AND COMMUNICATION METHOD TO TRANSMIT AND RECEIVE ETHERNET FRAMES

CLAIM OF PRIORITY

The present application claims priority from Japanese patent application JP 2012-151442 filed on Jul. 5, 2012, the content of which is hereby incorporated by reference into this application.

BACKGROUND

This invention generally relates to a communication apparatus and particularly relates to a communication apparatus for providing communication services.

In cloud computing (hereinafter, abbreviated as cloud), a server in a data center is accessed from remote sites; accordingly, a network among the sites and the data center is requisite. In many cases, the network used in the cloud for consumers is the Internet and the network used in the cloud for businesses is a virtual network system including VPNs (Virtual Private Networks) in view of security and network performance.

For a plurality of virtual networks to coexist in a single physical network, a system ensuring independencies of the virtual networks is necessary.

Network operators use wide area Ethernet employing a technology called extended VLAN tagging (VLAN stands for Virtual Local Area Network) or provider bridging (802.1Q-in-802.1Q, Q-in-Q, double tagging) standardized by IEEE 802.1ad to achieve the independencies of virtual networks. As to the extended VLAN tagging, refer to *The Evolution of Carrier Ethernet Services—Requirements and Deployment Case Studies*, Luyuan Fang et al., IEEE Communications Magazine, March, 2008, pp. 69-76.

The extended VLAN tagging is a technology that adds another VLAN tag to a VLAN tagged Ethernet Frame to make communications.

The VLAN tag of an Ethernet Frame which is added on the outer side of the Ethernet Frame is called STAG (Service TAG). The network apparatuses for extended VLAN tagged communication identify virtual networks for individual companies (tenants) by S-VLANs identified by STAGs to distribute Ethernet Frames to the individual virtual networks.

The VLAN tag of an Ethernet Frame which is added on the inner side than the STAG (on the payload-side of the Ethernet Frame) is called CTAG (Customer TAG). The network apparatuses for extended VLAN tagged communication identify individual networks in a company (tenant) by C-VLANs identified by CTAGs to distribute Ethernet Frames to individual office networks.

As described above, the extended VLAN tagged communication can be assured of independencies of networks among tenants and in each tenant by the STAG and the CTAG.

In the meanwhile, a network operator uses a system called appliance (network appliance) specialized for a specific function to provide the tenants with a cloud communication service. Examples of the appliance include a WOC (Wide Area Network Optimization Controller) or a WAN accelerator for improving the communication speed between data centers or sites, an IDS/IPS (Intrusion Detection System/Intrusion Protection System) or a FW (FireWall) for detecting or blocking an abnormal communication, and a session load balancer. The functions of these systems can improve the communication function and communication performance of the cloud. Accordingly, in the following description, cloud communication services having these functions are generally called communication services for convenience.

The appliances for providing communication services include quite a number of appliances which do not support network virtualization. For this reason, it is common to install such appliances in a site of a company or a data center logically configured to be private within a company.

However, for a network operator to provide a plurality of companies (tenants) with a communication service as one of the cloud functions, it is expected that appliances be installed in a shared apparatus having a function of a gateway in a switching office or a data center of the network operator. The network operator is required to configure the appliances for different virtual networks of individual companies (tenants).

Since the appliances are usually expensive, the installation cost and the operation cost are significantly elevated if the network operator installs as many appliances as the virtual networks. Accordingly, it is not practical to install appliances as many as virtual networks.

In view of the situation, sharing appliances among a plurality of virtual networks has been demanded and proposed for a network system accommodating a plurality of virtual networks (for example, refer to JP 2011-211502 A).

JP 2011-211502 A provides a solution: A network system includes an appliance, a switch and an administrative computer. The administrative computer includes a conversion policy table and each conversion entry indicates a correspondence relationship between pre-conversion packet identification information and post-conversion packet identification information. The pre-conversion packet identification information includes an identifier of a virtual network to which a packet belongs. The post-conversion packet identification information is set so as not to overlap between different virtual networks. The appliance includes a processing rule table. The switch includes a transfer table. The administrative computer sets the transfer table of the switch in such a way that packet identification information of a reception packet matching pre-conversion packet identification information is rewritten into post-conversion packet identification information. Furthermore, the administrative computer sets a match condition for the processing rule table of the appliance to the post-conversion packet identification information.

In the meanwhile, there have been proposed techniques to apply server virtualization technology to a network, or techniques to provide a communication service as one virtual machine using virtualization software (for example, refer to US 2010/0146074 A).

US 2010/0146074 A provides a means for providing a WAN optimization service, which is a kind of communication service, using virtualization software: In one example embodiment, an apparatus may include a first virtual machine provided on a first local device of a plurality of local devices, wherein a portion of resources of the first local device are allocated to the first virtual machine. A virtualization software switch may be provided on the first local device, configured to forward or redirect at least some traffic from the first local device to a WAN (Wide Area Network) optimization virtual appliance, the WAN optimization virtual appliance including at least the first virtual machine, a second virtual machine on a second local device of the plurality of local devices, and a distributed WAN optimization application running at least on the first and second virtual machines.

SUMMARY

When an appliance is shared among a plurality of virtual networks with the technique disclosed in JP 2011-211502 A, a failure in the appliance caused by communications of one company (tenant) using the appliance may affect the communications of the other companies using the same appliance. Accordingly, the communication service processed by an appliance needs to be independent among the companies like virtual networks.

In the meanwhile, for a network operator to provide a communication service such as WAN optimization as one of the cloud services to a plurality of companies (multiple tenants) with the technique disclosed in US 2010/0146074 A, it is desirable to provide communication services with the shared appliance while ensuring the independencies of the tenants with respect to both of the virtual network communications such as wide-area Ethernet and the communication services. That is to say, it is desirable that the network operator offer communication services executed on virtual machines in association with extended tagged VLAN communications.

However, in applying a communication service running on a traditional virtual machine, a network apparatus included in an appliance can identify only the tenant and cannot identify the kind of the communication service or the direction of the communication (which logical port to receive or send a packet to apply the intended communication service) by an STAG used in traditional extended tagged VLAN communications. Accordingly, a technique to appropriately incorporate and coordinate these techniques is demanded.

This invention aims to provide, in a network accommodating a plurality of virtual networks, a means for providing at least one communication service such as WAN optimization and FW specific to individual virtual networks using virtual machines in a shared apparatus.

A solution is that a shared apparatus of virtual networks converts a identifier for a virtual network contained in an Ethernet frame to an identifier for identifying a virtual machine providing a communication service.

A representative example of this invention is a communication apparatus provided on a communication path between a server and a client for sending and receiving Ethernet Frames through a physical network with each other, the server and the client being allocated at least one virtual network, each of the Ethernet Frames including a first identifier for identifying one of the at least one virtual network, the communication apparatus comprising: an information processing unit for executing at least one communication service on the Ethernet Frames; a tag conversion unit for converting the Ethernet Frames; and a transfer unit for intercepting the Ethernet Frames sent and received between the server and the client and sending the intercepted Ethernet Frames toward the tag conversion unit, the information processing unit including at least one virtual machine for executing a communication service on Ethernet Frames, the communication service being specific to one of the at least one virtual network transmitting the Ethernet Frames, and each of the at least one virtual machine including a first input/output port and a second input/output port, wherein the tag conversion unit holds conversion information including a second identifier identifying the first input/output port of a virtual machine for executing a communication service on Ethernet Frames transmitted in the virtual network identified by the first identifier, wherein, upon receipt of a first Ethernet Frame intercepted by the transfer unit, the tag conversion unit converts the first Ethernet Frame into a second Ethernet Frame including the second identifier based on the first identifier of the first Ethernet Frame and the conversion information and sends the second Ethernet Frame toward the first input/output port identified by the second identifier, wherein, in sending an Ethernet Frame on which the communication service has been executed from the virtual machine, the information processing unit converts the Ethernet Frame on which the communication service has been executed into a third Ethernet Frame including a third identifier identifying the second input/output port of the virtual machine which has executed the communication service, wherein, in a case where the conversion information includes the third identifier identifying the second input/output port of the virtual machine for executing the communication service on Ethernet Frames transmitted in the virtual network identified by the first identifier, the tag conversion unit converts the third Ethernet Frame into the first Ethernet Frame including the first identifier based on the third identifier and the conversion information upon receipt of the third Ethernet Frame, and wherein the transfer unit sends the first Ethernet Frame toward the server or the client of the destination of the first Ethernet Frame.

According to a representative aspect of this invention, communication services specific to individual virtual networks can be provided at lower cost.

Objects, configuration, and effects of this invention other than those described above are clarified in the following description of embodiments.

BRIEF DESCRIPTION OF THE DRAWINGS

FIG. 6 is an explanatory diagram illustrating a service table in Embodiment 1;

FIG. 7 is an explanatory diagram illustrating a resource management table in Embodiment 1;

FIG. 8 is an explanatory diagram illustrating a conversion table in Embodiment 1;

FIG. 20 is an explanatory diagram illustrating a conversion table in Embodiment 2;

DETAILED DESCRIPTION OF THE EMBODIMENTS

Hereinafter, embodiments of this invention will be described with reference to the accompanying drawings. The same reference signs denote the same or equivalent elements throughout the drawings. For convenience of explanation, suffixes may be added to the reference signs for discrimination.

Embodiment 1

Embodiment 1 describes a communication node apparatus for providing clients (such as companies, referred to as tenants hereinafter) with a plurality of communication services (cloud communication services), such as WAN optimization and firewall, in different combinations in a virtual network system.

One of the communication services using a virtual network system is wide area Ethernet. The wide area Ethernet is a service for connecting remote sites by transparently transmitting Ethernet frames (hereinafter Ethernet Frames) of tenants via a network operator's network. The wide area Ethernet provides Layer 2 VPNs using the VLAN technology.

The wide area Ethernet is a service allowing, under a condition where a plurality of companies (corresponding to tenants) having domestic and overseas offices share a physically same network, an office of some company to communicate with another office of the same company as if making communications via a logical LAN of the company without communicating with offices of the other companies.

The wide area Ethernet can be implemented by extended VLAN tagging standardized by IEEE 802.1ad or Ether over Ether standardized by IEEE 802.1 ah. The former extended VLAN tagging is a technique that adds a VLAN tag for the network operator to identify a tenant adjacent to and ahead of a VLAN tag for identifying a network of each tenant in an Ethernet Frame. The extended VLAN tagging is also referred to as Q-in-Q or a provider bridge.

The latter Ether over Ether is a technique that encapsulates an Ethernet Frame for a tenant (client) with an Ethernet Frame for a network operator. The Ether over Ether is also referred to as MAC-in-MAC or a provider backbone bridge.

Figure 1:
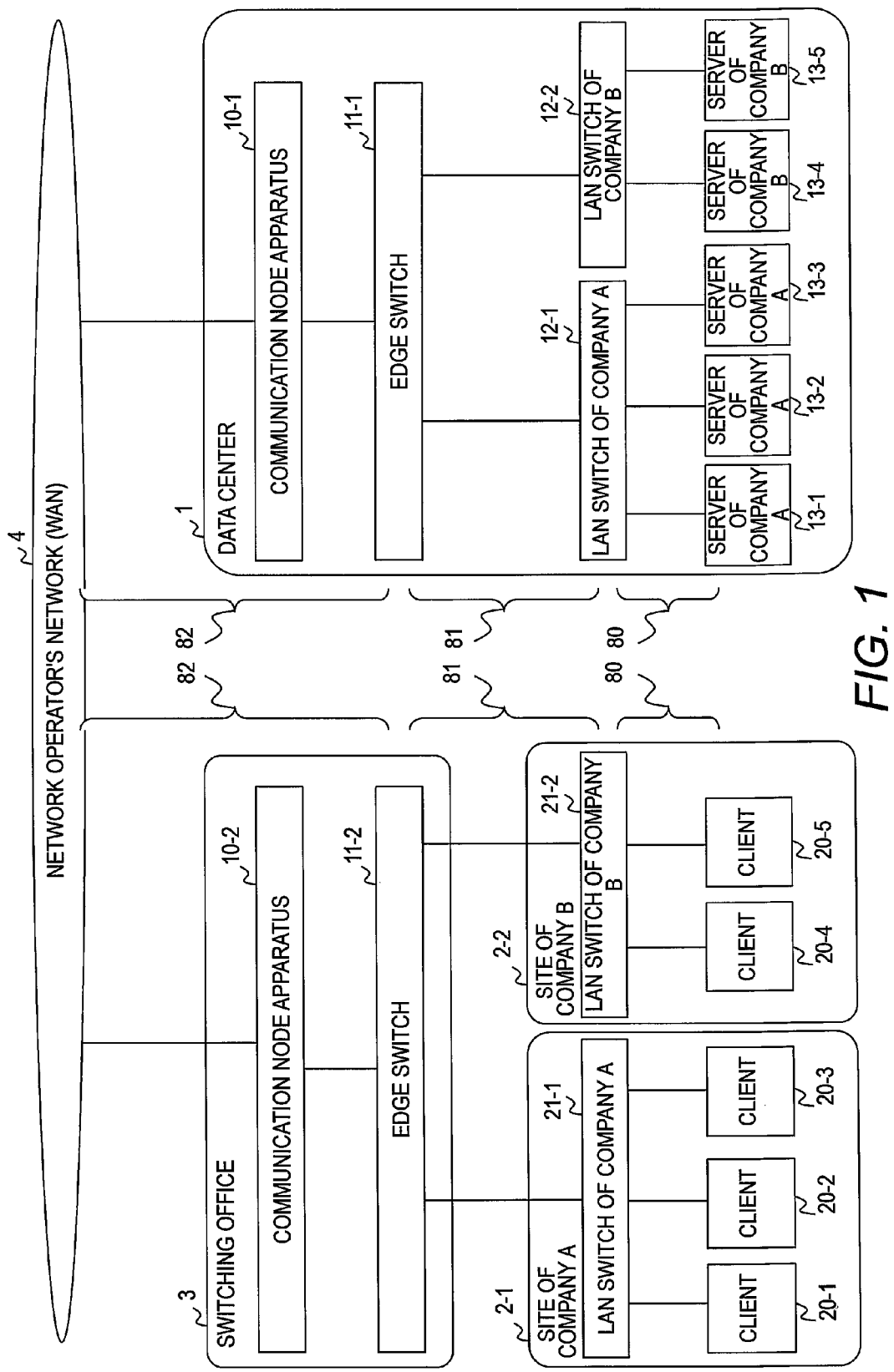
FIG. 1 is a block diagram illustrating a configuration of a system for providing communication services in Embodiment 1.

FIG. 1 is a block diagram illustrating a configuration of a system for providing communication services in Embodiment 1.

The system configuration shown in FIG. 1 illustrates a configuration of a network system for providing communication services. The network system of Embodiment 1 includes a site 2-1 of Company A, a site 2-2 of Company B, a switching office 3, a network operator's network (WAN) 4, and a data center 1.

The system of FIG. 1 has two tenants: Company A and Company B. Each tenant has servers 13 and clients 20 which communicate with one another via a virtual network. A tenant in this embodiment is defined as a group including at least one client and at least one server and allocated a virtual network.

Company A has a site 2-1 of Company A and Company B has a site 2-2 of Company B. The site 2-1 of Company A includes a LAN switch 21-1 and a plurality of clients 20 (20-1 to 20-3) of Company A; the site 2-2 of Company B includes a LAN switch 21-2 and a plurality of clients 20 (20-4 and 20-5) of Company B.

The data center 1 includes a communication node apparatus 10-1, an edge switch 11-1, a plurality of LAN switches 12 (12-1 and 12-2), and a plurality of servers 13 (13-1 to 13-5). Company A has the LAN switch 12-1 and the servers 13-1 to 13-3; Company B has the LAN switch 12-2 and the servers 13-4 and 13-5.

Each tenant, Company A or Company B, is allocated a different virtual network. Company A makes communications within Company A via the virtual network configured for Company A. Furthermore, a single tenant is allocated virtual networks such as VLANs.

The switching office 3 includes a communication node apparatus 10-2 and an edge switch 11-2. The switching office 3, the WAN 4, the communication node apparatus 10-1 in the data center 1, and the edge switch 11-1 in the data center 1 constitute a system provided by a network operator.

The communication node apparatuses 10 are apparatuses for providing communication services in this Embodiment 1 to the tenants. The communication node apparatuses 10 (10-1 and 10-2) provide communication services for individual tenants (or individual virtual networks) in accordance with the received Ethernet Frames.

The communication node apparatuses 10 may have the functions of an edge switch 11. Then, the edge switches 11 in FIG. 1 are not necessary. The data center 1 in FIG. 1 includes only one communication node apparatus 10-1 but may include a plurality of communication node apparatuses 10. If the data center 1 includes a plurality of communication node apparatuses 10, communication node apparatuses 10 may be connected in a star topology with the communication node apparatus 10-1 in FIG. 1 in the center; alternatively, the communication node apparatus 10-1 in FIG. 1 and communication node apparatuses 10 may be connected in a row.

The switching office 3 may also include a plurality of communication node apparatuses 10, like the data center 1.

Figure 2:
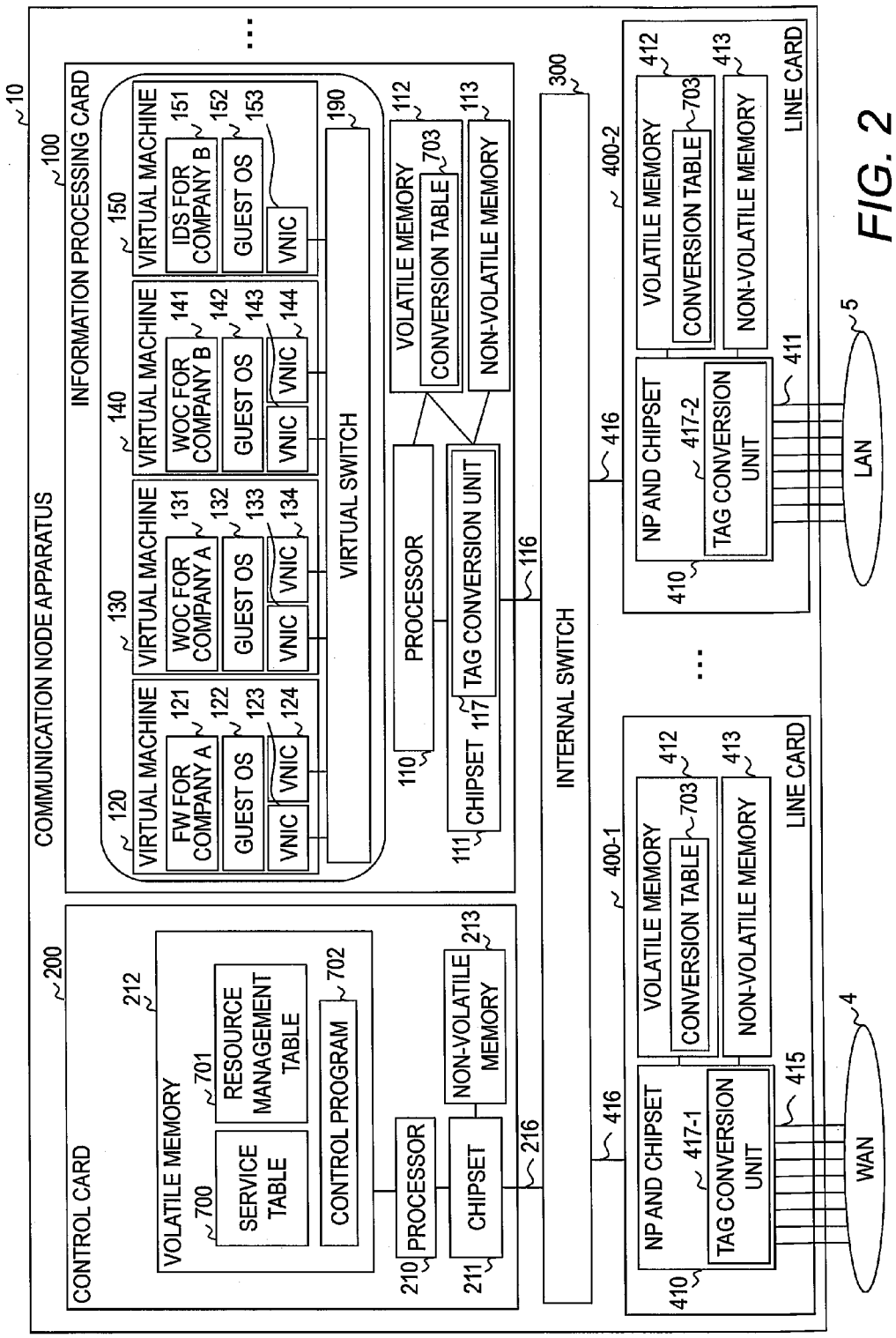
FIG. 2 is an explanatory diagram illustrating a physical configuration of a communication node apparatus in Embodiment 1 and a logical configuration implemented by the physical configuration.

FIG. 2 is an explanatory diagram illustrating a physical configuration of a communication node apparatus 10 in Embodiment 1 and a logical configuration implemented by the physical configuration.

A communication node apparatus 10 includes at least one line card 400, at least one information processing card 100, a control card 200, and an internal switch 300. The example of FIG. 2 includes two line cards 400. The LAN 5 shown in FIG. 2 is a network for connecting directly to the edge switch 11 without using the WAN 4.

The line card 400 is a processing unit for transferring Ethernet Frames. Since this embodiment provides explanation based on the Layer 2 using VLANs, this description employs the term Ethernet Frame, which however can be replaced by the term packet.

The information processing card 100 is a processing unit for executing communication services such as WAN optimization. The control card 200 is a processing unit for performing various configuration and control operations for the communication node apparatus 10. The internal switch 300 is a processing unit for connecting the cards included in the communication node apparatus 10.

The information processing card 100, line cards 400, and control card 200 shown in FIG. 2 are the elements of the communication node apparatus 10; but a part or all of the elements can be integrated in the apparatus. In such a case, the control card 200, the information processing card 100, and the line cards 400 respectively mean a control unit, an information processing unit, and transfer units in the following description.

A line card 400 includes a backplane interface 416, an NP and chipset 410, a volatile memory 412, and a non-volatile memory 413. The line card 400-1 shown in FIG. 2 is a processing unit for communicating with the WAN 4 through a network interface 415 and the line card 400-2 is a processing unit for communicating with the LAN switch 12 or the LAN switch 21 through a network interface 411.

The backplane interface 416 is an interface for connecting with the internal switch 300.

The NP (Network Processor) and chipset 410 is a computing device for processing Ethernet Frames. The NP and chipset 410 includes a tag conversion unit 417.

The NP and chipset 410 extracts the destination of an Ethernet Frame received from the WAN 4 or the LAN 5 and transmits the Ethernet Frame to the LAN 5 or the WAN 4 in accordance with the extracted destination. The NP and chipset 410 in this embodiment takes (intercepts) an Ethernet Frame before transmitting to the LAN 5 or the WAN 4 and makes the tag conversion unit 417 process the intercepted Ethernet Frame.

The tag conversion unit 417 converts the tag of an Ethernet Frame for extended VLAN tagged communication in accordance with a conversion table 703 and transfers the Ethernet Frame with the converted tag to the information processing card 100.

The volatile memory 412 is a storage device for temporarily holding Ethernet Frames and storing table information such as a conversion table and a forwarding table, which will be described later. The volatile memory 412 may be a DRAM (Dynamic Random Access Memory) or an SRAM (Static Random Access Memory); in most cases, a DRAM is used because of its high capacity. To the volatile memory 412, a conversion table 703 is loaded from the non-volatile memory 413.

The non-volatile memory 413 is a storage device for storing programs, data, configuration information, and the like. The non-volatile memory 413 may be an HDD (Hard Disk Drive), an SSD (Solid State Drive), or a flash memory; in most cases, a flash memory is used because of its inexpensive price, satisfactory durability, and small heat generation. The programs and data stored in the non-volatile memory 413 are loaded by the NP and chipset 410 to the volatile memory 412 as necessary.

The information processing card 100 includes a backplane interface 116, a processor 110, a chipset 111, a volatile memory 112, and a non-volatile memory 113. The backplane interface 116 is an interface for the chipset 111 to connect with the internal switch 300.

The processor 110 is a computing device for executing programs of communication services and may be a CPU. The chipset 111 is a computing device and includes a tag conversion unit 117. The tag conversion unit 117 has the same function as the tag conversion unit 417 to convert the tags of Ethernet Frames.

The volatile memory 112 is a storage area for temporarily holding Ethernet Frames, storing table information such as a conversion table 703, and for the processor 110 or the chipset 111 to deploy programs. The processor 110 runs a plurality of virtual machines and a virtual switch 190 on the volatile memory 112.

The non-volatile memory 113 is a storage area for storing programs, data, configuration information, and the like. The processor 110 and the chipset 111 load the data and the like stored in the non-volatile memory 113 to the volatile memory 112 to execute a program. The non-volatile memory 113 stores virtualization software, which is a program for implementing a virtual environment.

The processor 110 of the information processing card 100 runs virtualization software held in the non-volatile memory 113 to provide multitenancy communication services. As a result, the processor 110 can implement a virtual environment including a plurality of virtual machines and a virtual switch 190 for connecting the virtual machines.

The virtual environment illustrated in FIG. 2 includes four virtual machines (virtual machines 120, 130, 140, and 150) and a virtual switch 190. The virtual machines perform processing like physical computers. The processor 110 runs virtual machines for different communication services in different virtual networks.

The virtual machine 120 includes a guest OS (Operating System) 122 and runs a firewall service program 121 for Company A or a communication service for Company A on the guest OS 122. The virtual machine 120 further includes VNICs (Virtual NICs) 123 and 124. The VNIC 123 is an interface having a communication port for the WAN 4 and the VNIC 124 is an interface having a communication port for the LAN 5.

The virtual machine 130 includes a guest OS 132 and runs a WAN optimization service program 131 for Company A or a communication service for Company A on the guest OS 132. The virtual machine 130 further includes VNICs 133 and 134. The VNIC 133 is an interface having a communication port for the WAN 4 and the VNIC 134 is an interface having a communication port for the LAN 5.

The virtual machine 140 includes a guest OS 142 and runs a WAN optimization service program 141 for Company B or a communication service for Company B on the guest OS 142. The virtual machine 140 further includes VNICs 143 and 144. The VNIC 143 is an interface having a communication port for the WAN 4 and the VNIC 144 is an interface having a communication port for the LAN 5.

The virtual machine 150 includes a guest OS 152 and runs an IDS (Intrusion Detection System) service program 151 for Company B or a communication service for Company B on the guest OS 152. The IDS service program 151 for Company B shown in FIG. 2 detects intrusions only to communications in the WAN 4. Accordingly, the virtual machine 150 includes only a VNIC 153 having a communication port for the WAN 4.

In this embodiment, in the case where a virtual machine provides a communication service involving data transfer, the virtual machine is equipped with two communication ports for the WAN 4 and the LAN 5. Accordingly, such a virtual machine is allocated two VNICs per virtual machine.

The communication service (cloud communication services) involving data transfer may be WAN optimization, firewall, IPS (Intrusion Protection System), session load balancing, or the like.

In the case where a virtual machine provides a communication service involving data receiving only but not involving data transfer, the virtual machine is allocated one VNIC to receive data. The communication service not involving data transfer may be IDS (Intrusion Detection System) service that processes only Ethernet Frames transmitted from the WAN 4 to the LAN 5.

Although not shown in the drawings, the administrator of the network operator may allocate each virtual machine a VNIC dedicated to control-purpose communications with virtual machines, in addition to VNICs for data transfer.

When the virtual switch 190 receives an Ethernet Frame from an interface such as a VNIC (123, 124, 133, 134, 143, 144, or 153) or a physical NIC included in the NP and chipset 410 of a line card 400, it refers to a forwarding table stored in the volatile memory 112. The virtual switch 190 transfers the Ethernet Frame and adds or deletes a VLAN tag in accordance with the forwarding table.

The control card 200 includes a backplane interface 216, a processor 210, a chipset 211, a volatile memory 212, and a non-volatile memory 213. The backplane interface 216 is an interface for connecting with the internal switch 300.

The chipset 211 includes a computing device and performs transfer of an Ethernet Frame. The processor 210 is a computing device such as a CPU and runs a control program 702.

The volatile memory 212 is a storage area for storing programs, data, tables, and the like. The volatile memory 212 is also a storage area for the processor 210 or the chipset 211 to deploy programs and data retrieved from the non-volatile memory 213. The volatile memory 212 stores a control program 702, a service table 700, and a resource management table 701.

The non-volatile memory 213 is a storage area for storing data, tables, programs, configuration information, and the like.

The above-mentioned tables (the service table 700, the resource management table 701, and the conversion table 703) held in the communication node apparatus 10 holds information in the format of table. However, the communication node apparatus 10 in this embodiment may employ any format if the information in the tables can be held; for example, the apparatus 10 can hold the information in CSV format.

The tag conversion unit 117 and the tag conversion unit 417 may be implemented as processing units included in the chipsets, otherwise, may be implemented by a program.

Figure 3:
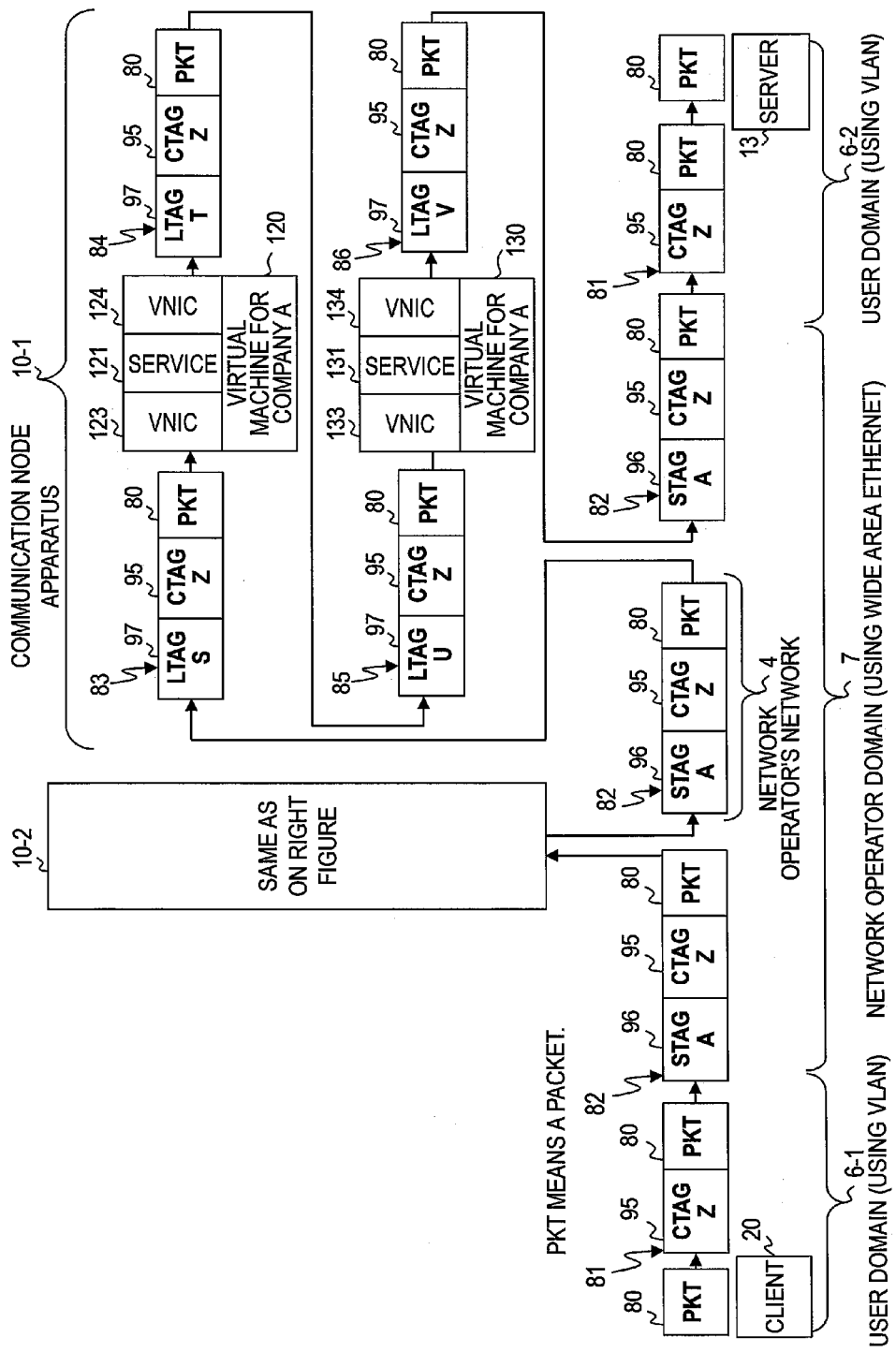
FIG. 3 is an explanatory diagram illustrating transformation of an Ethernet Frame in the wide area Ethernet in Embodiment 1.

Now, described with FIG. 3 is transmission of an Ethernet Frame in a virtual network in the network system shown in FIG. 1, or the wide area Ethernet using extended VLAN tagging.

FIG. 3 is an explanatory diagram illustrating transformation of an Ethernet Frame in the wide area Ethernet in Embodiment 1.

FIG. 3 is a diagram schematically illustrating changes of VLAN tags added to an Ethernet Frame in the wide area Ethernet in this embodiment. A network operator domain 7 is defined as the network of the switching office 3, the WAN 4, and the edge switch 11-1 in the data center 1. A user domain 6-1 is defined as the network of the clients 20 and the edge switch 11-2 and a user domain 6-2 is defined as the network of the servers 13 and the edge switch 11-1.

Figure 4:
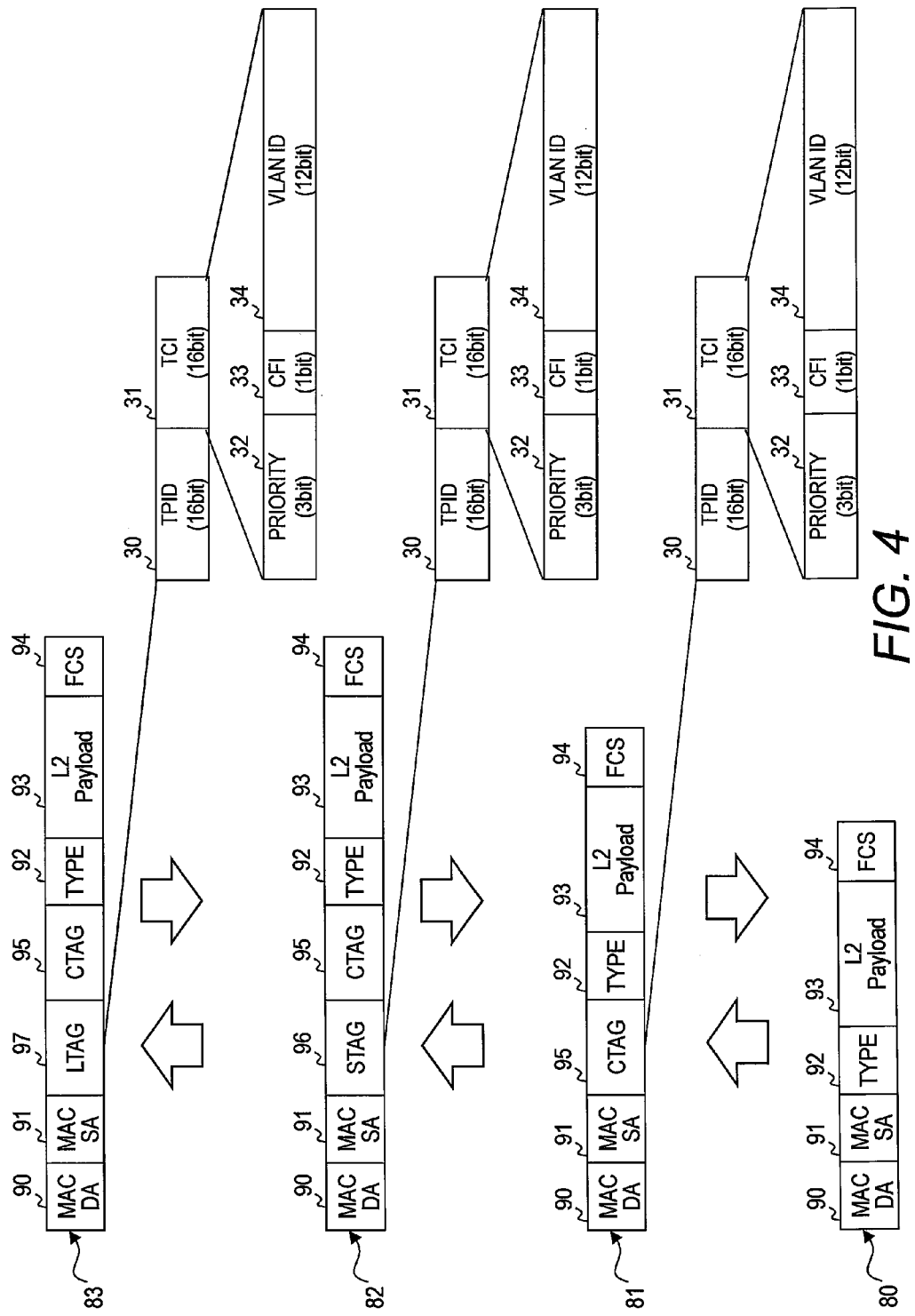
FIG. 4 is an explanatory diagram illustrating formats of an Ethernet Frame in Embodiment 1.

FIG. 4 is an explanatory diagram illustrating formats of an Ethernet Frame in Embodiment 1.

The Ethernet Frames transmitted in the network system of Embodiment 1 are in the formats of Ethernet Frame 80, Ethernet Frame 81, Ethernet Frame 82, and Ethernet Frame 83 shown in FIG. 4.

The Ethernet Frame 80 includes a MAC DA (Destination Address) 90, a MAC SA (Source Address) 91, a Type 92, an L2 Payload (Layer 2 Payload) 93, and an FCS (Frame Check Sequence) 94.

The MAC DA 90 contains a MAC address indicating the destination of the Ethernet Frame. The MAC SA 91 contains a MAC address indicating the source of the Ethernet Frame. The Type 92 indicates the type of the L2 Payload or the length of the L2 Payload.

The L2 Payload 93 is a data field of the Ethernet Frame. The FCS 94 stores a value for detecting an error of the frame. In the case of a wide area Ethernet using the extended VLAN tagging, an STAG 96 and a CTAG 95 are inserted between the MAC SA 91 and the Type 92.

In FIG. 1, each client 20 in the site 2-1 of Company A communicates with one of the servers 13 (servers 13-1 to 13-3) via a different virtual network. For a specific example, the client 20-1 and the server 13-1 in FIG. 1 belong to the same VLAN in Company A. Described hereinafter is a case where the client 20-1 communicates with the server 13-1.

First, the client 20-1 sends an Ethernet Frame 80 toward the server 13-1. The LAN switch 21-1 of Company A inserts a VLAN tag including an identifier uniquely identifying the VLAN between the client 20-1 and the server 13-1 into the Ethernet Frame 80 to create an Ethernet Frame 81 shown in FIG. 4. This VLAN tag is called CTAG.

The VLAN tag of the Ethernet Frame 81 is the CTAG 95 in the Ethernet Frame 81 in FIG. 3. The LAN switch 21-1 of Company A sends the created Ethernet Frame 81 to the switching office 3.

In the wide area Ethernet, the VLAN tag inserted by the switch in the site (in the foregoing description, the LAN switch 21-1 of Company A) is called CTAG. The LAN switch 21-1 of Company A inserts a CTAG 95 between the MAC SA 91 and the Type 92 of the Ethernet Frame 80 as shown in FIG. 4.

The VLAN tag (CTAG) consists of a 16-bit TPID (Tag Protocol IDentifier) 30 and a 16-bit TCI (Tag Control Identifier) 31. The TCI 31 consists of a 3-bit PRIORITY 32, a 1-bit CFI 33, and a 12-bit VID (VLAN IDentifier) 34 as shown in FIG. 4.

The TPID 30 contains an identifier (for example, 0x8100) identifying the tag including this TPID 30 as a VLAN tag. That is to say, the TPID 30 in the CTAG 95 identifies the tag as a CTAG.

The VID 34 identifies the VLAN number (virtual network number) of the VLAN in which the Ethernet Frame 81 including this VID 34 is transmitted. In general, VID=0 and VID=4095 have been reserved; the VID 34 contains one of the 4094 identifiers for VLANs. The example of the CTAG 95 in FIG. 3 shows the VID 34 as "Z".

Upon receipt of the Ethernet Frame 81 from the site 2-1 of Company A at the switching office 3, the edge switch 11-2 inserts a VLAN tag (STAG 96) for identifying the tenant as Company A or Company B to the Ethernet Frame 81. Through this operation, the Ethernet Frame 82 shown in FIG. 4 is created. The Ethernet Frame 82 in FIG. 3 shows the VLAN tags of the Ethernet Frame 82. The edge switch 11-2 sends the created Ethernet Frame 82 to the WAN 4 via the communication node apparatus 10-2.

In the wide area Ethernet, the VLAN tag inserted at the switching office 3 is called an STAG. The edge switch 11-2 inserts an STAG 96 between the MAC SA 91 and the CTAG 95 of the Ethernet Frame 81 as shown in FIG. 4.

The STAG 96 consists of a 16-bit TPID 30 and a 16-bit TCI 31, like the foregoing CTAG 95. The TPID 30 of the STAG 96 is a value identifying the VLAN tag as an STAG, which is 0x88a8 according to IEEE 802.1ad. The TPID 30 of the STAG 96 may contain 0x9100, 0x9200, or 0x9300 depending on the vendor. The example of STAG 96 shown in FIG. 3 shows the VID 34 as "A".

In the following description, the value of an STAG means the value of the VID 34 of the STAG 96.

When the data center 1 receives the Ethernet Frame 82 via the WAN 4, the communication node apparatus 10-1 transfers the received Ethernet Frame 82 to the edge switch 11-1 if the network operator does not provide a communication service to the tenant of the destination of the Ethernet Frame 82.

It should be noted that the processing of the communication node apparatus 10 in the case where the network operator needs to provide a cloud communication service to the tenant of the destination of the Ethernet Frame 82 received by the data center 1 via the WAN 4 will be described later.

Upon receipt of the Ethernet Frame 82, the edge switch 11-1 refers to the STAG 96 to identify the tenant (client) as Company A or Company B, which is the tenant to receive the Ethernet Frame 82. Next, the edge switch 11-1 deletes the STAG 96 from the Ethernet Frame 82 to create the Ethernet Frame 81 shown in FIG. 4. Then, the edge switch 11-1 sends the created Ethernet Frame 81 to the LAN switch 12 of the tenant (client) identified by the STAG 96.

Upon receipt of the Ethernet Frame 81 from the edge switch 11-1, the LAN switch 12-1 identifies the virtual network by the CTAG 95. Next, the LAN switch 12-1 deletes the CTAG 95 to create the Ethernet Frame 80 shown in FIG. 4. Then, the LAN switch 12-1 sends the created Ethernet Frame 80 to the server 13-1 of Company A associated with the virtual network identified by the CTAG 95.

In this way, the apparatuses (the LAN switch 21, the LAN switch 12, and the edge switches 11-1 and 11-2) required to distinguish tenants (clients) or virtual networks in some tenant add and delete a CTAG 95 and an STAG 96 to distinguish tenants or virtual networks in some tenant, enabling communications in the wide area Ethernet.

Next, described is the processing of the communication node apparatus 10-1 in the case where the network operator needs to provide a cloud communication service to the tenant of the destination of the Ethernet Frame 82 received by the data center 1 via the WAN 4.

To provide a communication service to a tenant by applying the service to a received Ethernet Frame, the communication node apparatus 10-1 performs tag conversion on the Ethernet Frame 82 and executes the communication service for the tenant on the Ethernet Frame with the converted tag.

The communication node apparatus 10-1 adds an identifier uniquely identifying a combination of the communication service to be executed by a virtual machine and the communication port of the virtual machine to the Ethernet Frame in order to properly send the Ethernet Frame to the communication port (VNIC 123 or VNIC 133) of the virtual machine.

Specifically, the communication node apparatus 10-1 shown in FIGS. 2 and 3 has four identifiers: an identifier for the combination of the firewall service program 121 for Company A and the VNIC 123, an identifier for the combination of the firewall service program 121 for Company A and the VNIC 124, an identifier for the combination of the WAN optimization service program 131 for Company A and the VNIC 133, and an identifier for the combination of the WAN optimization service program 131 for Company A and the VNIC 134.

In this embodiment, the tags containing these identifiers in the communication node apparatus 10 are called LTAGs (Local TAGs), which are shown as LTAGs 97 in FIG. 3. An LTAG 97 includes an identifier which is not common to either different communication services or different communication ports. To provide a series of communication services to an Ethernet Frame in each virtual network, the communication node apparatus 10 has a conversion table 703 to convert an STAG 96 into an LTAG 97.

The format of an Ethernet Frame including an LTAG 97 is illustrated as the Ethernet Frame 83 in FIG. 4. The Ethernet Frame 83 has a format in which the STAG 96 of the Ethernet Frame 82 has been converted to (replaced by) the LTAG 97. The LTAG 97 has the same format as a normal VLAN tag, having fields of a TPID 30 and a TCI 31. Since the LTAG 97 has the same format as the VLAN tag, the communication node apparatuses 10 and the internal switch 300 and the virtual switch 190 in the communication node apparatus 10 can transfer Ethernet Frames including LTAGs 97 without introduction of a special technology to any of the communication node apparatus 10, the internal switch 300, and the virtual switch 190 in the network system of Embodiment 1.

In the following description, the value of an LTAG means the value of the VID 34 of the LTAG 97.

Values for the TPIDs 30 of LTAGs 97 are predetermined for each system at least to be different from the values for the TPIDs 30 of STAGs 96 in order to distinguish between the LTAGs 97 and the STAGs 96.

The values for the TPIDs 30 of LTAGs 97 are determined to be also different from the values for the TPIDs used for standard protocols such as IPv4 (TPID=0x0800), IPv6 (TPID=0x86DD), and ARP (TPID=0x0806). Hence, the value of the TPID 30 of an LTAG 97 may be determined to be any value other than the traditionally specified TPID values. For example, the value of the TPID 30 of the LTAG 97 may be TPID=0x8100, 0x9100 or 0x9200 unless used for the STAG 96, or any special value determined by the system.

The communication node apparatus 10 in this embodiment intercepts Ethernet Frames 82 for extended VLAN tagged communication during transmission of the Ethernet Frames in the virtual networks. The communication node apparatus 10 applies tag conversion to each intercepted Ethernet Frame 82 and makes a virtual machine execute a communication service to the Ethernet Frame in which the tag has been converted, in providing the communication service to a tenant.

In tag conversion, the communication node apparatus 10 converts (replaces) the STAG 96 of the intercepted Ethernet Frame 82 into (with) an LTAG 97 with reference to the above-mentioned conversion table 703 and then sends the Ethernet Frame to the virtual switch 190.

When the virtual switch 190 of a communication node apparatus 10 receives an Ethernet Frame, the virtual switch 190 that has received the Ethernet Frame transfers the Ethernet Frame to the communication port (VNIC) of the virtual machine represented by the LTAG 97 of the Ethernet Frame. When transferring the Ethernet Frame to the communication port, the virtual switch 190 deletes the LTAG 97 of the Ethernet Frame.

After the virtual machine 120 executes a communication service on the Ethernet Frame, the communication port (VNIC) of the virtual machine 120 sends the Ethernet Frame. The virtual switch 190 adds an LTAG 97 representing the executed communication service and the communication port that has sent the Ethernet Frame to the Ethernet Frame sent from the virtual machine.

When the line card 400 receives the Ethernet Frame on which the communication service has been executed by a virtual machine, the line card 400 converts the LTAG 97 of the Ethernet Frame into an STAG 96 based on the LTAG 97 added to the Ethernet Frame and the conversion table. Through this operation, the communication node apparatus 10 converts the Ethernet Frame processed by the virtual machine 120 into an Ethernet Frame 82 and sends the Ethernet Frame 82 to the destination thereof.

Through the foregoing process, the communication node apparatus 10 can transfer an intercepted Ethernet Frame to the communication port of the virtual machine to execute the communication service to process the Ethernet Frame. Hence, the communication node apparatus 10 can coordinate the virtual network with the communication service.

Now, a specific example of tag conversion is described with FIG. 3. The conversion table 703 in this example specifies the followings.

The conversion table 703 in the example of FIG. 3 specifies that the VNIC 123 is assigned an LTAG 97 containing "S" in the VID 34 and the VNIC 124 is assigned an LTAG 97 containing "T" in the VID 34. Furthermore, the conversion table 703 specifies that the VNIC 133 is assigned an LTAG 97 containing "U" in the VID 34 and the VNIC 134 is assigned an LTAG 97 containing "V" in the VID 34. Still further, the conversion table 703 specifies, if an Ethernet Frame 82 received from the WAN includes an STAG 96 containing "A" in the VID 34, the STAG 96 is to be converted to an LTAG 97 containing "S" in the VID 34.

Such a conversion table 703 including the foregoing values indicates that, if the STAG 96 of an intercepted Ethernet Frame 82 being transmitted from the WAN to the LAN indicates "A", the intercepted Ethernet Frame 82 is to receive communication services of the firewall service program 121 for Company A and the WAN optimization service program 131 for Company A in this order.

According to the foregoing conversion table 703, the communication node apparatus 10-1 shown in FIG. 3 creates an Ethernet Frame 83 in which the STAG 96 of the Ethernet Frame 82 has been converted to an LTAG 97 containing "S" in the VID 34. The Ethernet Frame 83 is transmitted to the virtual machine 120 in accordance with the value of the LTAG 97 and the virtual machine 120 executes the firewall service program 121 for Company A on the Ethernet Frame 83.

Subsequently, the virtual switch 190 sends an Ethernet Frame 84 in which the LTAG of the Ethernet Frame 83 has been replaced by an LTAG containing "T" in the VID 34. The value of the VID 34 of the LTAG 97 of the sent Ethernet Frame 84 is converted from "T" to "U" based on the conversion table 703. Through this operation, an Ethernet Frame 85 is created.

The Ethernet Frame 85 is transferred to the VNIC 133 assigned "U" for the VID 34. After the Ethernet Frame 85 is input to the VNIC 133 of the virtual machine 130 and the virtual machine 130 executes the WAN optimization service program 131 for Company A on the contents of the Ethernet Frame 85, the virtual machine 130 sends an Ethernet Frame 86 in which the LTAG of the Ethernet Frame 85 has been replaced by an LTAG containing "V" in the VID 34. Through conversion of the LTAG 97 to an STAG 96, the Ethernet Frame 86 is converted to the Ethernet Frame 82 for the extended VLAN tagged communication before being intercepted.

Subsequently, the communication node apparatus 10-1 sends the Ethernet Frame 82 to the edge switch 11 (user domain 6-2) of the original destination. Through the processing described above, the communication node apparatus 10-1 provides the tenant of the destination of the Ethernet Frame 82 with communication services.

In the case where an Ethernet Frame 82 is sent from the user domain 6-2 to the network operator domain 7, the communication node apparatus 10-1 performs the processing in the direction reverse to the above-described conversion. In the case where an Ethernet Frame 82 is sent from the network operator domain 7 to the user domain 6-1, the communication node apparatus 10-2 performs the processing in the direction same as the above-described conversion.

In the case where an Ethernet Frame 82 is sent from the user domain 6-1 to the network operator domain 7, the communication node apparatus 10-2 performs the processing in the direction reverse to the above-described conversion. In other words, the communication node apparatus 10-1 and the communication node apparatus 10-2 have the same functions.

For the communications in the other VLANs (virtual networks) in Company A and the communications in the VLANs (virtual networks) in Company B, the same processing as the above-described conversion is performed.

Figure 5:
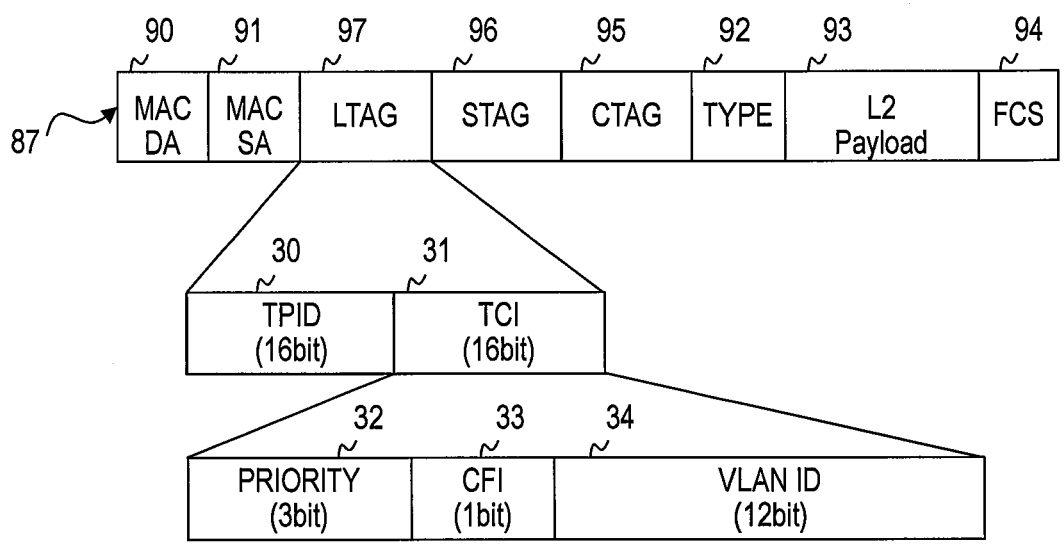
FIG. 5 is an explanatory diagram illustrating an example of an Ethernet Frame in Embodiment 1.

The foregoing description about the conversion is based on an example where an STAG 96 is converted to (replaced by) an LTAG 97; however, the LTAG 97 may be added on the outer side of the STAG 96 as shown in FIG. 5.

FIG. 5 is an explanatory diagram illustrating an example of an Ethernet Frame 87 in Embodiment 1.

The communication node apparatus 10 may create an Ethernet Frame 87 by inserting an LTAG 97 to an Ethernet Frame 82 in the tag conversion. In this case, the conversion table 703 includes information specifying, if the extended VLAN tag begins with an STAG 96, an LTAG 97 should be added before the STAG 96 or, if the extended VLAN tag begins with an LTAG 97, the LTAG 97 should be replaced by another LTAG 97 or deleted.

FIG. 6 is an explanatory diagram illustrating the service table 700 in Embodiment 1.

The service table 700 in the control card 200 is a table to manage the communication services to be applied to individual virtual networks and the resources (such as virtual machines) in the communication node apparatus 10 to be used for the communication services. The service table 700 includes fields for which the administrator of the network operator determines the values in accordance with contracts with tenants and fields for which the control program 702 determines the values.

The service table 700 includes tenants 710, bandwidths 711, services 712, service qualities (latencies) 713, allocated CPU cores 714, and allocated memories 715 for the fields for which the administrator determines the values.

Each tenant 710 includes an identifier for uniquely identifying a tenant. The tenant 710 may include the name of the tenant. Each bandwidth 711 indicates the communication bandwidth contracted by the tenant.

Each service 712 indicates a communication service used by the tenant. Each service quality 713 indicates the service quality demanded by the tenant. The service quality 713 in FIG. 6 includes a value indicating what extent of latency can be accepted.

Each allocated CPU core 714 indicates the allocation manner and the number of processor cores or threads to execute the communication service. Each allocated memory 715 indicates the size of the memory allocated to the communication service.

The service table 700 further includes STAGs 716, LTAGs 717, ports 718, apparatus numbers 719, information processing card numbers 720, virtual machine numbers 721, and VNIC information 722 for the fields for which the values are determined by the control program 702.

Each STAG 716 includes the STAG identifier (represented by the value of the VID 34 of the STAG 96) assigned to the tenant. For example, the value of the STAG 716 includes the value of the STAG 96 to be used to identify the tenant at the edge switch 11 shown in FIG. 1.

Each LTAG 717 includes the identifier (represented by the value of the VID 34 of the LTAG 97) assigned to the combination of a communication service and a communication port (VNIC).

Each port 718 indicates the communication port of the VNIC assigned to the value of the LTAG 717. The port 718 in FIG. 6 contains a value indicating whether the VNIC is connected to the WAN 4 or the LAN 5.

Each apparatus number 719 includes the identifier of the communication node apparatus 10. Since the example of FIG. 6 is based on an assumption that only one communication node apparatus 10 is used, the apparatus numbers 719 show only one identifier; however, if a number N of communication node apparatuses 10 are used, identifiers of 1 to N are used.

Each information processing card number 720 includes the identifier of the information processing card 100 including the virtual machine for providing the communication service to the tenant. Since the example of FIG. 6 is based on an assumption that only one information processing card 100 is used, the information processing card numbers 720 show only one identifier, however, if a number N of information processing cards 100 are used, identifiers of 1 to N are used. Each VM number 721 includes the identifier of the virtual machine for providing the communication service to the tenant.

Each piece of VNIC information 722 includes information indicating the identification number, the virtual MAC address, the VLAN mode, the VID (VLAN number), and the virtual IP address for a guest OS, and the like, of the VNIC.

The VLAN mode in the VNIC information 722 is a value indicating whether to employ VLAN tagging. The VLAN number in the VNIC information 722 indicates the VID to use the VNIC as a port for VLAN tagging.

The information processing card 100 in this embodiment uses the VNICs in the VLAN mode. In the VLAN mode, a VNIC is uniquely associated with the identifier of a VLAN tag. Accordingly, the control program 702 in this embodiment can uniquely associate the values of VIDs 34 in the fields of LTAGs 717 in the service table 700 with the identifiers identifying the VNICs by making the VLAN numbers of the VNICs identical to the VIDs 34 of the LTAGs.

This configuration allows the internal switch 300 and the virtual switch 190 to discriminate Ethernet Frames by VLAN number and the processing unit for identifying the destinations of Ethernet Frames refers to the LTAG 97 of an Ethernet Frame to send the Ethernet Frame to the VNIC represented by the VID 34 of the LTAG 97. In similar, the internal switch 300 and the virtual switch 190 refer to the LTAG 97 of an Ethernet Frame to send the Ethernet Frame to the virtual machine via the VNIC indicated by the VNIC information 722, so that the Ethernet Frame can be processed by the communication service running on a guest OS.

The service table 700 does not need to hold values specifying that the same communication service is to be applied within the same tenant. For example, the service table 700 may hold different numbers or different kinds of communication services for different departments or users. In such cases, the service table 700 may hold CTAGs, source IP addresses, destination IP addresses, source ports, destination ports, and protocols as a part of the identifiers of communications in the tenant, in addition to the STAGs 716 in FIG. 6. A CTAG is a value of the VID 34 of a CTAG 95 which is the identifier for identifying a C-VLAN used in the tenant.

In a general method, the processor 110 of the information processing card 100 can identify which user of which tenant has sent the received Ethernet Frame using a communication service program and determine whether the communication service is to be applied to the Ethernet Frame in accordance with the result of the identification. This method, however, may lead the line card 400 to send Ethernet Frames to unnecessary communication service programs, causing heavy load to the communication service programs.

However, the tag conversion unit 417 in the line card 400 in this embodiment adds information specifying which communication service should be applied to an Ethernet Frame with reference to the conversion table 703 created based on the service table 700. Accordingly, the line card 400 transfers only the minimum Ethernet Frames to each virtual machine to execute a communication service on the processor 110. This configuration reduces the load to the virtual machines.

FIG. 7 is an explanatory diagram illustrating the resource management table 701 in Embodiment 1.

The resource management table 701 in the control card 200 includes fields for managing the amount of physical resources to be used in the communication node apparatus 10, fields for managing the amount of unallocated resources (the remaining amount after allocation), and fields for managing the VIDs 34 of the LTAGs 97 assigned to the VNICs.

The resource management table 701 includes information processing card numbers 740, numbers of mounted cores (numbers of mounted threads) 741, amounts of mounted memories 742, numbers of allocated dedicated cores 743, numbers of allocated shared cores 744, and amounts of allocated memories 745 for the fields for managing resources.

Each information processing card number 740 contains the identifier of an information processing card 100. Each number of mounted cores 741 indicates the number of processor cores or threads the processor 110 of the information processing card 100 has for allocation to virtual machines.

Each amount of mounted memory 742 indicates the size of the storage area the volatile memory 112 of the information processing card 100 has for allocation to virtual machines.

Each number of allocated dedicated cores 743 indicates the number of processor cores or threads which have already been allocated to virtual machines dedicatedly. Each number of allocated shared cores 744 indicates the number of processor cores or threads which have already been allocated to virtual machines for sharing (in a shared state). Each amount of allocated memory 745 indicates the size of the storage area allocated to virtual machines.

Accordingly, the value obtained by subtracting the sum of the value of the number of allocated dedicated cores 743 and the value of the number of allocated shared cores 744 from the number of mounted cores 741 is the amount of remaining processor cores (or threads). In similar, the value obtained by subtracting the value of the amount of allocated memory 745 from the amount of mounted memory 742 is the amount of remaining memory.

The resource management table 701 further includes communication node apparatus numbers 750, unused LTAGs 751, and the numbers of unused LTAGs 752 for the fields for managing the VIDs 34 of the LTAGs 97 assigned to the VNICs. Each communication node apparatus number 750 is an identifier uniquely identifying a communication node apparatus 10.

Each unused LTAGs 751 hold the values of unassigned VIDs 34 among the candidate VIDs 34 of LTAGs 97 held by the communication node apparatus number 750. Each number of unused LTAGs 752 indicates the number of unassigned candidate VIDs 34 of LTAGs 97 (or the number of remaining LTAGs).

To perform the tag conversion illustrated in FIG. 3, the control program 702 needs to allocate two or more LTAGs for an STAG. Accordingly, if the total number of LTAGs is equal to the number of STAGs (for example, about 4,000), the LTAGs is not enough to be assigned to all patterns of STAGs.

However, considering the amount of physical resources included in a single communication node apparatus 10, the same number of LTAGs as the STAGs (for example, about 4,000) is sufficient for a single communication node apparatus 10 in most cases. For example, if the resource management table 701 stores four times as many LTAGs as the STAGs, the table 701 may probably hold useless candidate VIDs 34 of LTAGs 97.

Accordingly, the control program 702 in this embodiment can assign LTAGs for all the STAGs if each communication node apparatus 10 has a resource management table 701 containing the same number, for example, about 4,000, of candidate VIDs 34 of LTAGs 97 as the number of STAGs 96.

It should be noted that a plurality of information processing cards 100 included in one communication node apparatus 10 may be divided into at least one block and the resource management table 701 may hold the same number, for example, about 4,000, of candidate VIDs 34 of LTAGs 97 as the number of STAGs for each block.

FIG. 8 is an explanatory diagram illustrating the conversion table 703 in Embodiment 1.

The conversion table 703 is created based on the information of the service table 700 to specify the order of applying communication services, the values for LTAGs and STAGs to be converted to and from each other, the values indicating the VNICs where to transfer Ethernet Frames (or the values of LTAGs), and the kinds of communication services. The conversion table 703 is stored in the volatile memory 412 and the volatile memory 112 by the control program 702, so that the tag conversion unit 417 in the line card 400 and the tag conversion unit 117 in the information processing card 100 can perform tag conversion on Ethernet Frames.

The conversion table 703 includes IN TAGs 40 and IN PORTs 41 for fields to identify a received Ethernet Frame. The conversion table 703 further includes OUT TAGs 50, OUT PORTs 51, and SERVICEs 52.

Each IN TAG 40 contains a value (values for the TPID 30 and the VID 34) identifying the most anterior tag among the tags added to an Ethernet Frame for extended VLAN tagged communication.

Each IN PORT 41 identifies the input source of an Ethernet Frame. In the conversion table 703 shown in FIG. 8, "WAN" represents the WAN 4, "LAN" represents the LAN 5, and "CARD" represents the information processing card 100.

When an Ethernet Frame identified by an IN TAG 40 is input from the input source identified by an IN PORT 41, the tag conversion unit 417 or the tag conversion unit 117 converts the tag of the Ethernet Frame into the one specified by the OUT TAG 50 and sends the Ethernet Frame to the output destination specified by the OUT PORT 51. Through this operation, the tag conversion unit 417 or the tag conversion unit 117 makes the Ethernet Frame receive the communication service indicated by the SERVICE 52.

An entry of the conversion table 703 which contains "NONE" in the SERVICE 52 indicates that the tag conversion unit 417 sends the Ethernet Frame from the communication node apparatus 10 without applying a communication service.

The conversion table 703 in FIG. 8 includes tag conversion rules 60 for Company A (Tenant A) and tag conversion rules 61 for Company B (Tenant B). The table 703 also includes entries 762 to 766.

For example, when an Ethernet Frame including a VID 34 of 0x000A in the STAG 96 is input from a communication port connected to the WAN 4, the tag conversion unit 417 converts the STAG 96 of the Ethernet Frame into an LTAG including a VID 34 of 0x001A in accordance with the entry 762 of the conversion table 703.

Subsequently, the tag conversion unit 417 transfers the Ethernet Frame with the converted tag for the output destination indicated by CARD #1, instead of the original destination in the extended VLAN tagged communication. The information processing card 100 to receive the Ethernet Frame provides the communication service of firewall (FW).

In a modification, the conversion table 703 does not need to store values of communication services for each tenant but may store a different number or different kinds of communication services for each department or each user to use the services. In those cases, the conversion table 703 may contain values indicating a CTAG, a source IP address, a destination IP address, a source port, a destination port, and/or a protocol other than the STAG or LTAG in a field of IN TAG 40. Further, the conversion table 703 may contain a value indicating an LTAG in the OUT TAG 50 in an entry including a CTAG and/or other values in the IN TAG 40.

Such a modified conversion table 703 enables the network operator to provide the firewall service and the WAN optimization service to the communications of a specific VLAN in Company A (Tenant A) and to provide only the firewall service to the communications of the other VLANs in Company A, for example.

Figure 9:
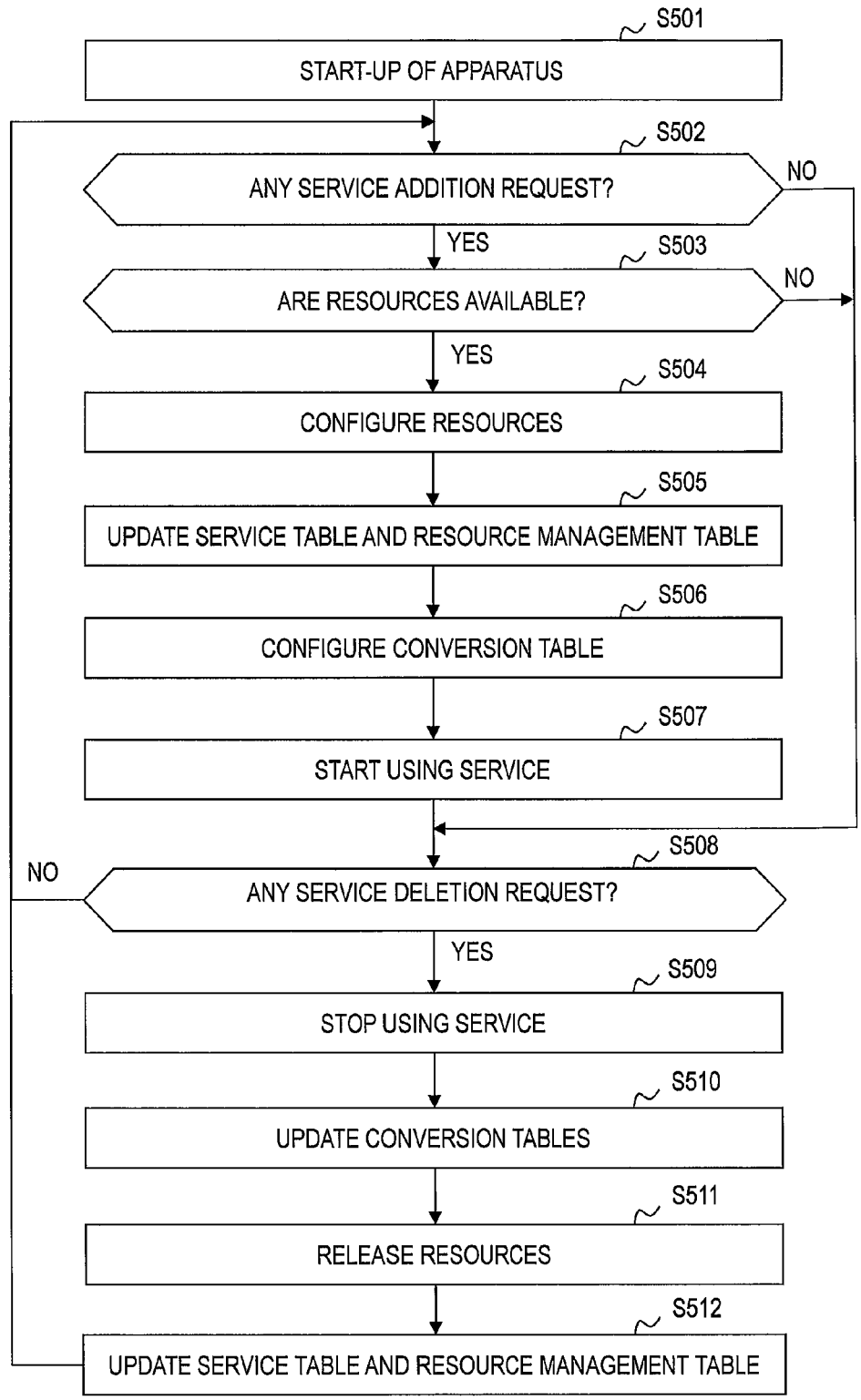
FIG. 9 is a flowchart illustrating adding or deleting a communication service in Embodiment 1.

FIG. 9 is a flowchart illustrating adding or deleting a communication service in Embodiment 1.

Upon receipt of a request for addition or deletion of a communication service from the administrator of the network operator, the control program 702 updates the service table 700 and the conversion table 703. FIG. 9 illustrates processing of adding a communication service to the communication node apparatus 10 and further deleting the communication service from a communication node apparatus 10 after start-up of the communication node apparatus 10.

When the communication node apparatus 10 is started up by the administrator of the network operator (S501), the control program 702 in the control card 200 determines whether a service addition request is input (S502). If the determination is that no service addition request is input, the control program 702 executes S508.

The service addition request input by the administrator includes the identifier of the tenant (the value of a tenant 710) to use the communication service to be added, and the identifier of the communication service (the value of a service 712) to be added. The service addition request input from the management terminal 900 further includes values of a bandwidth 711, a service quality 713, an allocated CPU core 714, and an allocated memory 715 for the communication service to be added.

If the determination is that a service addition request is input by the administrator, the control program 702 determines whether the resources (the bandwidth, processor cores, memory, and values for LTAGs 717) can be reserved for allocation to the virtual machine to execute the communication service designated by the addition request with reference to the resource management table 701 in the control card 200 (S503).

At S503, the control program 702 determines that values for LTAGs can be reserved if the values for LTAGs can be acquired from the resource management table 701 in accordance with the number of requested communication services to be added. The control program 702 assigns the acquired values for LTAGs to VLAN numbers for the VNICs allocated to virtual machines in order to execute requested communication services to be added.

If the determination at S503 is that the resources cannot be reserved, the control program 702 executes S508 because no virtual machine to perform the communication service can be configured. If the resources cannot be reserved, the control program 702 further notifies the administrator that the communication service cannot be added.

If the determination at S503 is that the resources can be reserved, the control program 702 configures an environment to perform the communication service on the information processing card 100 with the resources reserved for the requested communication service to be added based on the service addition request (S504). The resource configuration may include bandwidth configuration (based on the bandwidth 711 in the service table 700), activation of a virtual machine, and configuration of the virtual machine for the requested communication service to be added.

After S504, the control program 702 adds, in the resource management table 701, the amount of resources (the number of processor cores and the amount of memory) allocated to the virtual machine to provide the communication service to the number of allocated dedicated cores 743, the number of allocated shared cores 744, and the amount of allocated memory 745 of the entry representing the information processing card 100 in which the virtual machine is activated.

Further, the control program 702 deletes the values for LTAG acquired at S503 from the unused LTAGs 751 in the resource management table 701 (the unused LTAGs 751 of the entry representing the communication node apparatus 10 activated at S501).

Still further, the control program 702 stores values included in the service addition request in a new entry of the service table 700.

Still further, the control program 702 acquires the value of the STAG based on the value of the tenant 710 specified by the service addition request. Alternatively, the control program 702 may acquire the value of the STAG from the edge switch 11 based on the value of the tenant 710.

Still further, the control program 702 stores the acquired value of the STAG, the acquired values of LTAGs, and the values about the virtual machine activated at S504 in the STAG 716, LTAG 717, port 718, apparatus number 719, information processing card number 720, virtual machine number 721, and VNIC information 722 of the new entry in the service table 700 (S505). Through the foregoing operations, an entry representing the communication service added in accordance with the service addition request is added to the service table 700.

After S505, the control program 702 updates the conversion table 703 by inserting an entry representing the communication service designated by the addition request with reference to the predetermined order of execution of communication services (for example, FW for the first and WOC for the second) and the communication services to be provided to the tenant indicated in the service table 700, and the conversion table 703 held in the non-volatile memory 213.

Thereafter, the control program 702 stores the updated conversion table 703 to the volatile memories 412 in the line cards 400 and the volatile memory 112 in the information processing card 100 (S506). At S506, the control program 702 further stores the updated conversion table 703 in the volatile memory 212 or the non-volatile memory 213 in the control card 200.

After S506, the control program 702 starts the communication service in the virtual machine to perform the requested communication service to be added (S507).

After S502, S503, or S507, the control program 702 determines whether a service deletion request is input by the administrator of the communication node apparatus 10 (S508). If no service deletion request is input, the control program 702 returns to S502.

The service deletion request includes at least the identifier identifying the tenant (the value of a tenant 710) for which a communication service is to be deleted and the identifier identifying the communication service (the value of a service 712) to be deleted.

If the determination is that a service deletion request is input, the control program 702 stops the service program in the information processing card 100 (the service program in the virtual machine) for executing the communication service on the information processing card 100 designated by the deletion request (S509).

After S509, the control program 702 updates the conversion tables 703 in the line card 400, the information processing card 100, and the control card 200 so that the communication service designated by the service deletion request will not be executed on the Ethernet Frames transmitted in the tenant designated by the service deletion request (S510). For example, the control program 702 deletes the entries containing the identifier of the communication service designated by the deletion request in a SERVICE 52 among the entries of the conversion tables 703 for the tenant designated by the service deletion request.

After S510, the control program 702 releases the resources (the bandwidth, processor cores, memory, and LTAGs) allocated to the virtual machine for performing the communication service to be deleted (S511).

The control program 702 further subtracts, in the resource management table 701, the values indicating the released amounts of resources from the number of allocated dedicated cores 743, the number of allocated shared cores 744, and the amount of allocated memory 745 of the entry representing the information processing card 100 on which a service program is stopped. The control program 702 also deletes the entry representing the service from the service table 700 in accordance with the service deletion request.

After a communication service is added to or deleted from the communication node apparatus 10 through the processing of FIG. 9, the tag conversion unit 417 in the line card 400 and the tag conversion unit 117 in the information processing card 100 of the communication node apparatus 10 start tag conversion in accordance with the new conversion tables 703.

Figure 10:
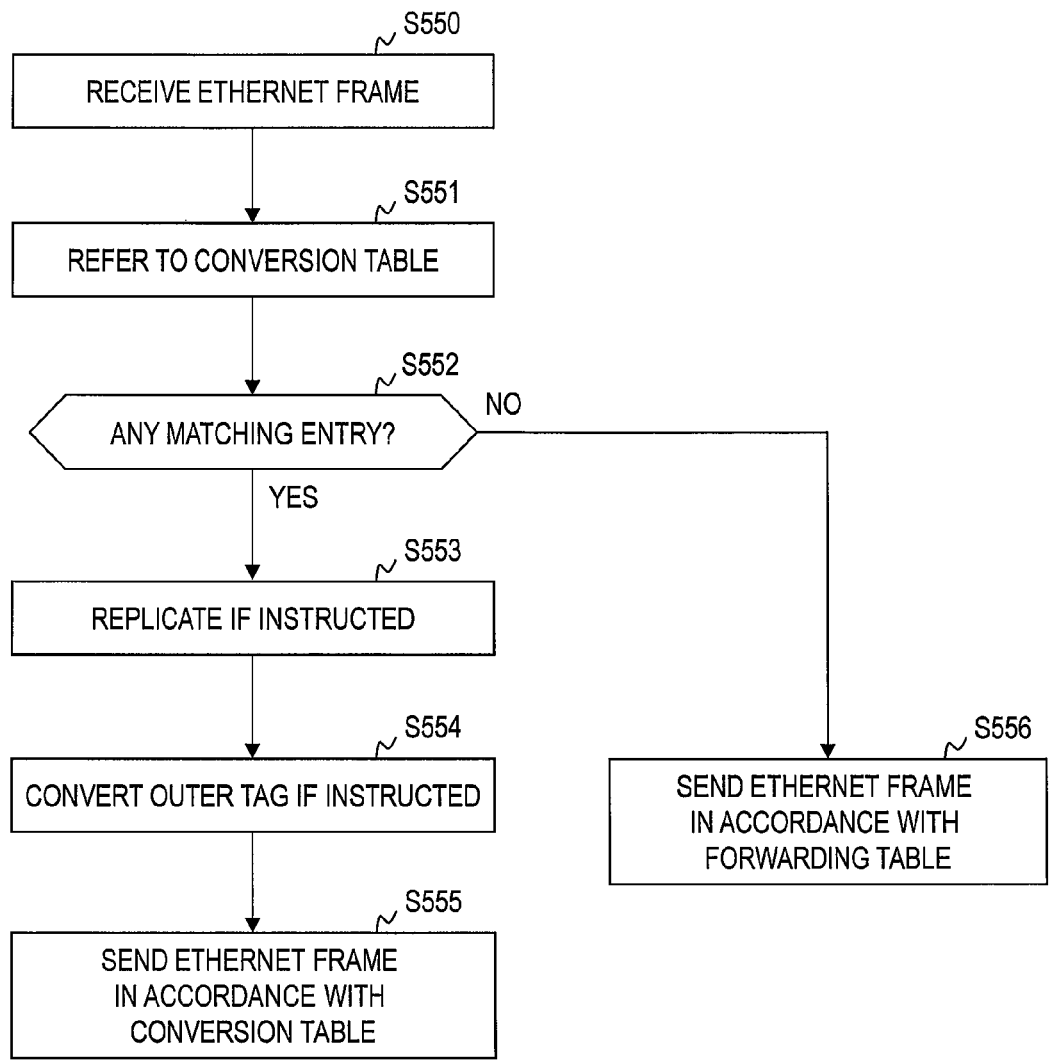
FIG. 10 is a flowchart illustrating tag conversion in a communication node apparatus in Embodiment 1.

FIG. 10 is a flowchart illustrating tag conversion in a communication node apparatus 10 in Embodiment 1.

Hereinafter, tag conversion by a tag conversion unit 417 is described with FIG. 10. It should be noted that the tag conversion by the tag conversion unit 117 and the tag conversion by the tag conversion unit 417 are explained by the same routine illustrated by FIG. 10.

Upon receipt of an Ethernet Frame at a line card 400 of a communication node apparatus 10, the NP and chipset 410 inputs the Ethernet Frame to the tag conversion unit 417 (S550). After S550, the tag conversion unit 417 refers to the conversion table 703 held in the volatile memory 412 (S551).

The processing at S550 and S551 is performed when an Ethernet Frame 82 is received from the WAN 4 or LAN 5 outside the communication node apparatus 10, when an Ethernet Frame 82 is received from another line card 400 in the communication node apparatus 10, when an Ethernet Frame 86 is received from the information processing card 100 in the communication node apparatus 10, or other situation.

The tag conversion unit 417 determines whether the most anterior tag in the VLAN tags of the received Ethernet Frame and the value indicating the input source of the Ethernet Frame respectively match the value of the IN TAG 40 and the value of the IN PORT 41 of any entry in the conversion table 703 (S552).

If the determination at S552 is that there is a matching entry in the conversion table 703, the tag conversion unit 417 determines whether the matching entry includes information of instruction for replication. In the following example, the tag conversion unit 417 determines that the entry includes information of instruction for replication if the matching entry at S552 includes two or more values in the OUT TAG 50. However, the tag conversion unit 417 can make the determination with any other criteria if it can determine whether the entry includes information of instruction for replication.

If the matching entry does not include information of instruction for replication, the tag conversion unit 417 executes S554. If the matching entry includes information of instruction for replication, the tag conversion unit 417 replicates the received Ethernet Frame in accordance with the instruction for replication (S553).

After S553, the tag conversion unit 417 converts the outermost tag of the Ethernet Frame for extended VLAN tagged communication in accordance with the value of the OUT TAG 50 of the matching entry (S554). Then, it sends the Ethernet Frame with the converted tag in accordance with the value of the OUT PORT 51 of the matching entry (S555).

If the determination at S552 is that there is no matching entry in the conversion table 703, the tag conversion unit 417 sends the received Ethernet Frame to the designated destination with reference to the ordinary forwarding table (called MAC address table or FDB (Forwarding DataBase)) stored in advance in the NP and chipset 410 (S556).

Next, tag conversion by the tag conversion unit 117 is described with FIG. 10. It should be noted that the tag conversion unit 117 applies tag conversion to the Ethernet Frames sent from the virtual switch 190.

When the information processing card 100 receives an Ethernet Frame from the internal switch 300, the processor 110 makes the virtual switch 190 process the received Ethernet Frame. Upon receipt of the Ethernet Frame, the virtual switch 190 deletes the outermost VLAN tag from the Ethernet Frame. Then, the virtual switch 190 transfers the Ethernet Frame without the outermost VLAN tag to a virtual machine in accordance with the forwarding table held in advance in the volatile memory 112.

Reversely, when the virtual switch 190 receives an Ethernet Frame from a virtual machine, the virtual switch 190 adds a VLAN tag (corresponding to an LTAG in this example) to the Ethernet Frame. Then, the virtual switch 190 transfers the Ethernet Frame including the VLAN tag to the chipset 111 in accordance with the forwarding table held in advance in the volatile memory 112.

When the tag conversion unit 117 of the chipset 111 receives the Ethernet Frame (S550), it refers to the conversion table 703 held in the volatile memory 112 (S551). Then, the tag conversion unit 117 performs the same processing from S552 to S555 by the tag conversion unit 417.

At S552, the tag conversion unit 117 founds no matching entry only when creation of the conversion table 703 is failed. If the conversion table 703 has been created successfully, the tag conversion unit 117 can find a matching entry at S552.

At S555, the tag conversion unit 117 sends the Ethernet Frame to the information processing card 100 including the tag conversion unit 117 (or the virtual switch 190 on the information processing card 100 performing the tag conversion), an information processing card 100 different from the information processing card 100 including the tag conversion unit 117 (or the virtual switch 190 on an information processing card different from the information processing card 100 performing the tag conversion), or a line card 400.

A specific example of the flowchart of FIG. 10 is described as follows.

Figure 11:
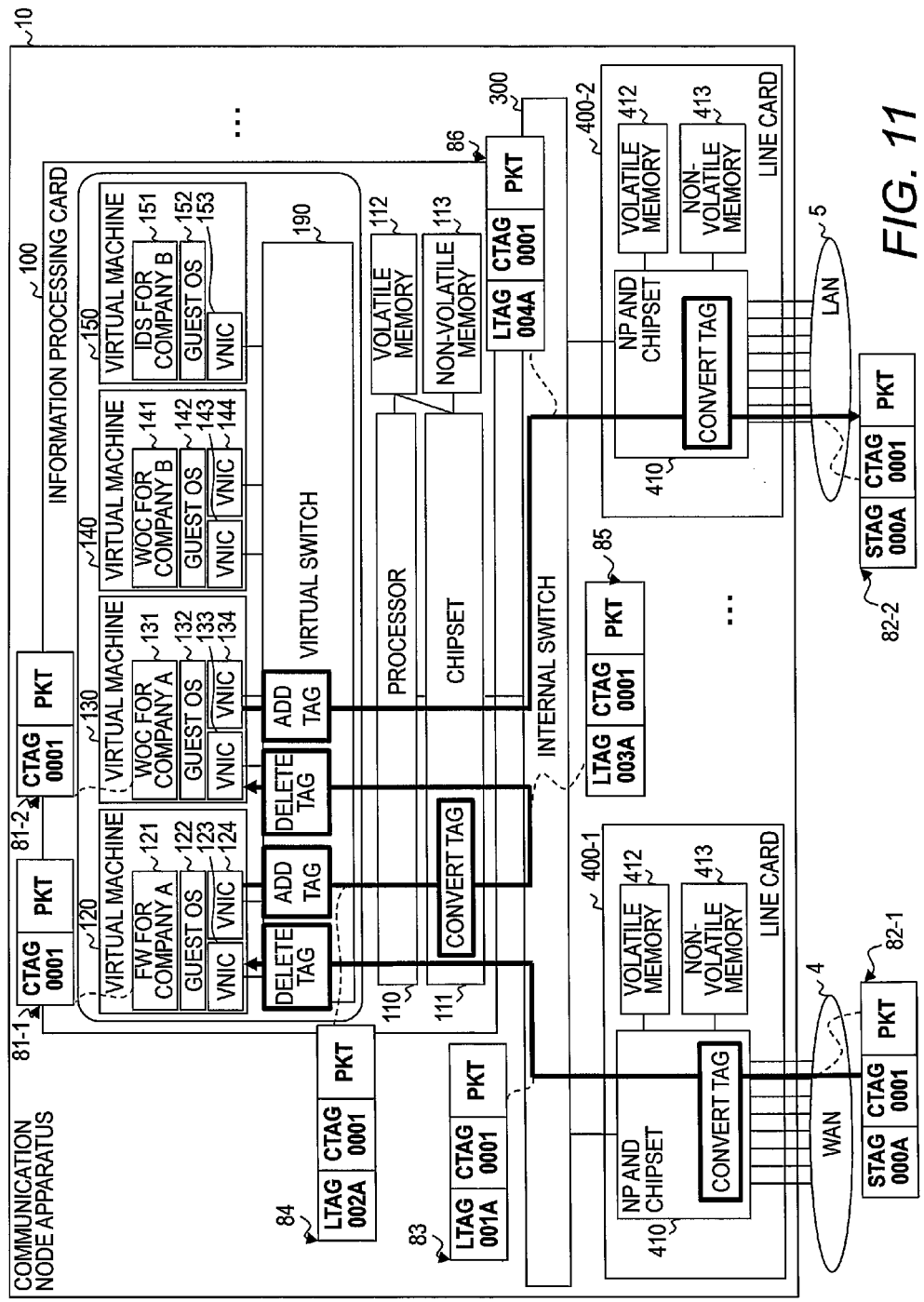
FIG. 11 is an explanatory diagram illustrating a specific example of tag conversion in Embodiment 1.

FIG. 11 is an explanatory diagram illustrating a specific example of tag conversion in Embodiment 1.

Illustrated in FIG. 11 is processing in a communication node apparatus 10 in the case where communication services of firewall (FW) and WAN optimization (WOC) are applied to the virtual network communication (wide area Ethernet communication using extended VLAN tagging) for Company A.

The communication node apparatus 10 shown in FIG. 11 receives an Ethernet Frame 82-1 from the WAN 4 and sends an Ethernet Frame 82-2 to the LAN 5.

Figure 12:
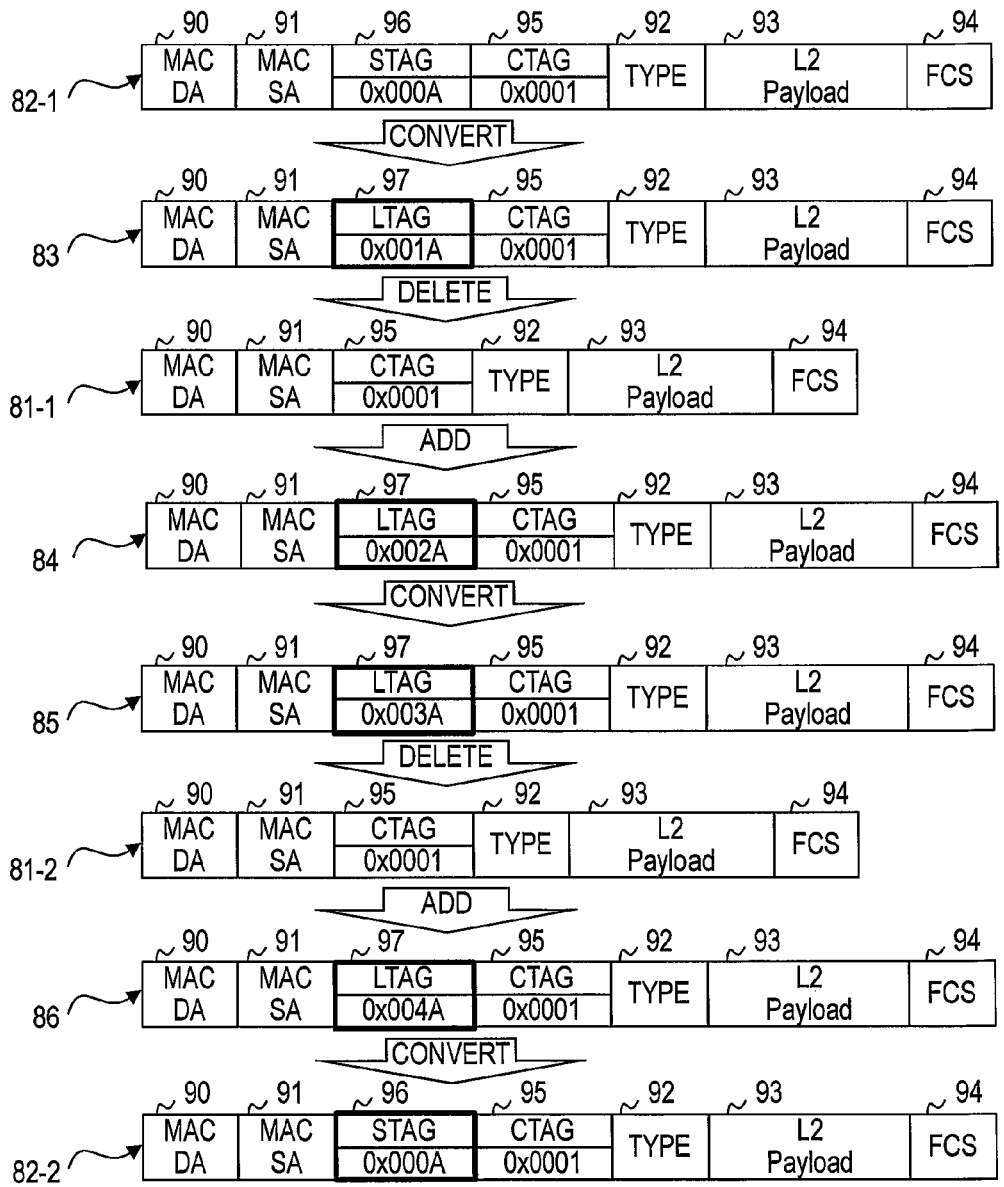
FIG. 12 is an explanatory diagram illustrating a specific example of an Ethernet Frame to which the tag conversion is applied in Embodiment 1.

FIG. 12 is an explanatory diagram illustrating a specific example of an Ethernet Frame to which the tag conversion is applied in Embodiment 1.

The Ethernet Frame 82-1 in FIG. 11 includes, like the Ethernet Frame 82 shown in FIG. 4, a MAC DA 90, a MAC SA 91, an STAG 96, a CTAG 95, a TYPE 92, an L2 Payload 93, and an FCS 94. The VID 34 of the STAG 96 shown in FIG. 11 is 0x000A, which is an identifier for the VID 34 identifying Company A.

When the NP and chipset 410 in the line card 400-1 receives an Ethernet Frame 82-1 for extended VLAN tagged communication shown in FIG. 12 from the WAN 4 (S550), the tag conversion unit 417-1 refers to the conversion table 703 of FIG. 8 held in the volatile memory 412 (S551).

After S551, the tag conversion unit 417-1 determines that the Ethernet Frame 82-1 matches the entry 762 in the conversion table 703 (in which the IN TAG 40 indicates an STAG 96 having VID=0x000A and the IN PORT 41 indicates the WAN 4) (S552). Since the OUT TAG 50 of the entry 762 contains one value (S553), the tag conversion unit 417-1 converts the STAG 96 of the Ethernet Frame 82-1 to an LTAG 97 including a VID 34 of 0x001A in accordance with the entry 762. This conversion creates the Ethernet Frame 83 in FIG. 12 (S554).

After S554, the tag conversion unit 417-1 sends the Ethernet Frame 83 to the internal switch 300 in accordance with the OUT PORT 51 of the entry 762 (S555). Upon receipt of the Ethernet Frame 83, the internal switch 300 identifies the information processing card 100 allocated the VNIC of the virtual machine represented by the value 0x001A of the VID 34 in the LTAG 97 of the Ethernet Frame 83 (which is the VNIC 123) and transfers the Ethernet Frame 83 for the identified information processing card 100.

Upon receipt of the Ethernet Frame 83 at the information processing card 100, the virtual switch 190 deletes the outermost VLAN tag (the LTAG 97 in FIG. 12) to create an Ethernet Frame 81-1 and inputs the Ethernet Frame 81-1 to the VNIC 123 represented by the value 0x001A of the VID 34 of the deleted VLAN tag (in this case, the LTAG 97). In this phase, the Ethernet Frame 81-1 is in a format including only the CTAG 95.

In this way, the firewall service program 121 for Company A on the guest OS 122 in the virtual machine 120 can execute the firewall service to the Ethernet Frame 81-1 input from the VNIC 123. Through the operations up to this step, the Ethernet Frame input to the firewall service program 121 for Company A is in a format including only the CTAG 95, which is used in Company A. Hence, the Ethernet Frames input to the program are guaranteed to be only Ethernet Frames for Company A and to receive the particular service (in this case, the firewall service) and there is no need to concern about inclusion of an Ethernet Frame for other company or an Ethernet Frame not to receive the particular service. In this regard, the other virtual machines are the same as the virtual machine 120; they execute their communication services on Ethernet Frames 81 including only CTAGs 95.

If the Ethernet Frame 81-1 can pass through the firewall service program 121 for Company A (or is not blocked by the firewall), the virtual machine 120 sends the Ethernet Frame 81-1 from the VNIC 124 to the virtual switch 190.

Upon receipt of the Ethernet Frame 81-1 from the VNIC 124, the virtual switch 190 adds an LTAG 97 (having a VID 34 of 0x002A) representing the VNIC 124 to the Ethernet Frame 81-1 to create the Ethernet Frame 84 in FIG. 12. Then, the virtual machine 120 sends the Ethernet Frame 84 to the chipset 111. The chipset 111 inputs the Ethernet Frame 84 to the tag conversion unit 117.

Upon receipt of the Ethernet Frame 84 (S550), the tag conversion unit 117 executes the processing of S551 to S555 in FIG. 10. The tag conversion unit 117 determines that the Ethernet Frame 84 matches the entry 763 in the conversion table 703 (in which the IN TAG 40 contains an LTAG 97 having a VID=0x002A and the IN PORT 41 contains CARD#1 (the same information processing card 100)).

Since the OUT TAG 50 of the entry 763 contains a single value (S553), the tag conversion unit 117 converts the LTAG 97 to an LTAG 97 having a VID 34 of 0x003A in accordance with the OUT TAG 50 of the entry 763. Through this conversion, the Ethernet Frame 85 in FIG. 12 is created (S554).

The tag conversion unit 117 sends the Ethernet Frame 85 to the internal switch 300 in accordance with the OUT PORT 51 of the entry 763.

Upon receipt of the Ethernet Frame 85, the internal switch 300 identifies that the destination assigned to the input source (the information processing card 100) of the Ethernet Frame 85 and the VNIC of the virtual machine represented by the value 0x003A for the VID 34 of the LTAG 97 (or the VNIC 133) is the information processing card 100 and transfers the Ethernet Frame 85 toward the identified information processing card 100.

When the information processing card 100 receives the Ethernet Frame 85, the virtual switch 190 deletes the outermost VLAN tag to create an Ethernet Frame 81-2 and inputs the Ethernet Frame to the VNIC 133 represented by the value 0x003A of the VID 34 of the deleted VLAN tag. In this phase, the Ethernet Frame 81-2 is in a format including only a CTAG 95.

Hence, the WAN optimization service program 131 for Company A on the guest OS 132 of the virtual machine 130 can execute the WAN optimization service on the Ethernet Frame 81-2 input from the VNIC 133.

If the WAN optimization service program 131 for Company A determines the Ethernet Frame 81-2 to go for the LAN, the Ethernet Frame 81-2 is sent from the VNIC 134 to the virtual switch 190. The virtual switch 190 adds an LTAG 97 (having a VID 34 of 0x004A) representing the VNIC 134 of the input source to the Ethernet Frame 81-2 to create the Ethernet Frame 86 in FIG. 12. Then, the virtual switch 190 inputs the Ethernet Frame 86 to the chipset 111.

Upon receipt of the Ethernet Frame 86 (S550), the tag conversion unit 117 of the chipset 111 executes the processing of FIG. 10. However, at S552, the tag conversion unit 117 determines that there is no matching entry in the conversion table 703. Accordingly, the tag conversion unit 117 sends the Ethernet Frame 86 to the internal switch 300 in accordance with the forwarding table held in advance (S556).

The internal switch 300 identifies that the destination associated with the input source (the information processing card 100) of the Ethernet Frame 86 and the value 0x004A of the VID 34 of the LTAG 97 is the line card 400-2 and sends the Ethernet Frame 86 to the identified destination.

When the NP and chipset 410 of the line card 400-2 receives the Ethernet Frame 86 (S550), the tag conversion unit 417-2 starts the processing of FIG. 10. The tag conversion unit 417-2 determines that the Ethernet Frame 86 matches the entry 764 of the conversion table 703 (in which the IN TAG 40 indicates an LTAG 97 having a VID 34=0x004A and the IN PORT 41 indicates CARD#1 (information processing card 100)) (S552).

Since the OUT TAG 50 of the entry 764 contains a single value (S553), the tag conversion unit 417-2 converts the LTAG 97 of the Ethernet Frame 86 into an STAG 96 having a VID 34 of 0x000A in accordance with the entry 764. This conversion creates an Ethernet Frame 82-2 (S554).

The tag conversion unit 417-2 sends the Ethernet Frame 82-2 from the line card 400-2 to the LAN 5 in accordance with the OUTPUT PORT 51 of the entry 764 (S555).

Through the above-described processing, communication services can be applied to a virtual network service (a wide area Ethernet using extended VLAN tagging) for Company A.

Now, described hereinafter is another specific example of the processing of FIG. 10.

Figure 13:
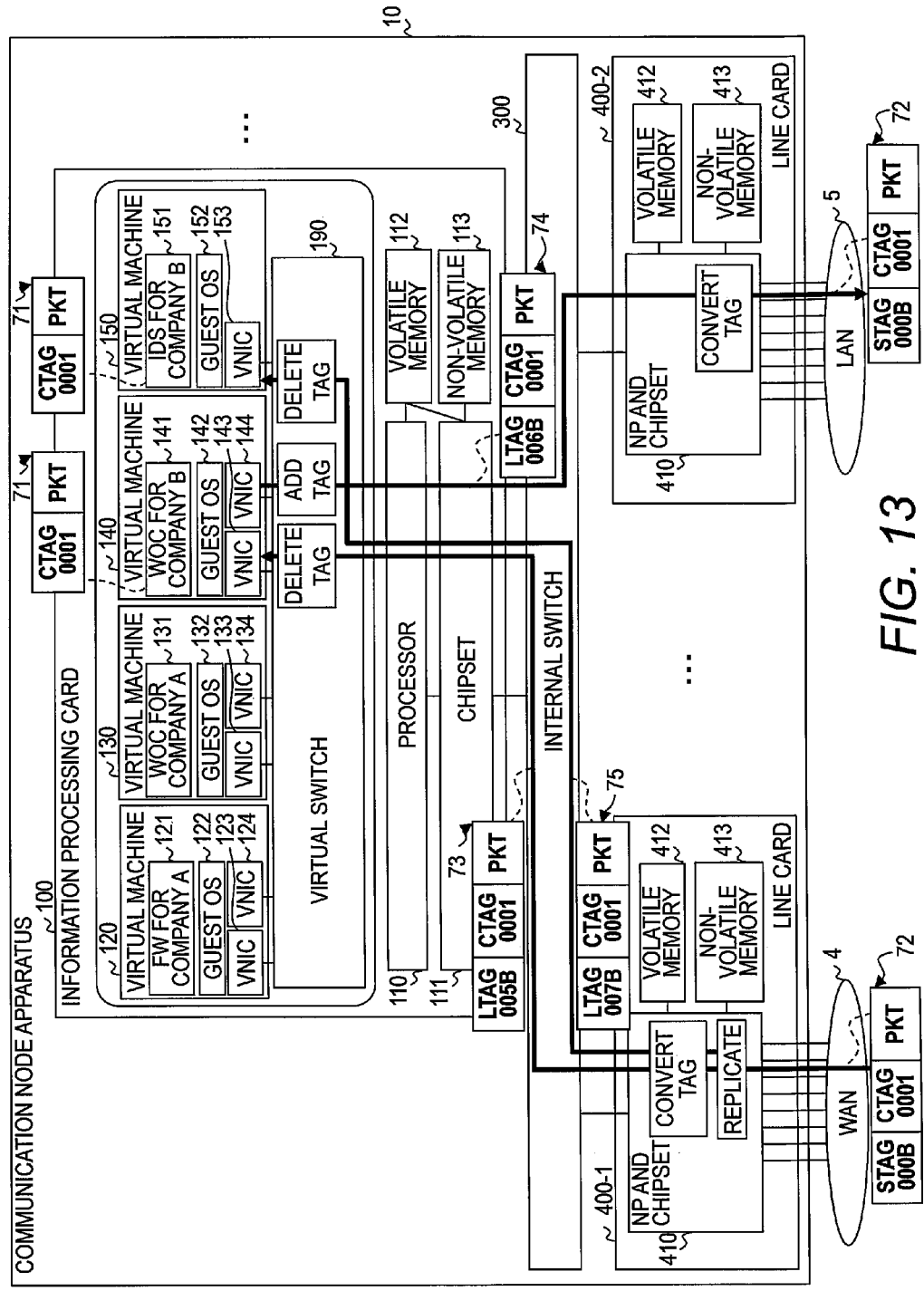
FIG. 13 is an explanatory diagram illustrating a specific example of tag conversion involving replication of an Ethernet Frame in Embodiment 1.

FIG. 13 is an explanatory diagram illustrating a specific example of tag conversion involving replication of an Ethernet Frame in Embodiment 1.

Illustrated in FIG. 13 is processing in a communication node apparatus 10 in the case where communication services of intrusion detection (IDS: Intrusion Detection System) and WAN optimization are applied to the virtual network communication (wide area Ethernet communication using extended VLAN tagging) for Company B.

The communication node apparatus 10 shown in FIG. 13 receives an Ethernet Frame 72 from the WAN 4 and sends the Ethernet Frame 72 to the LAN 5.

Figure 14:
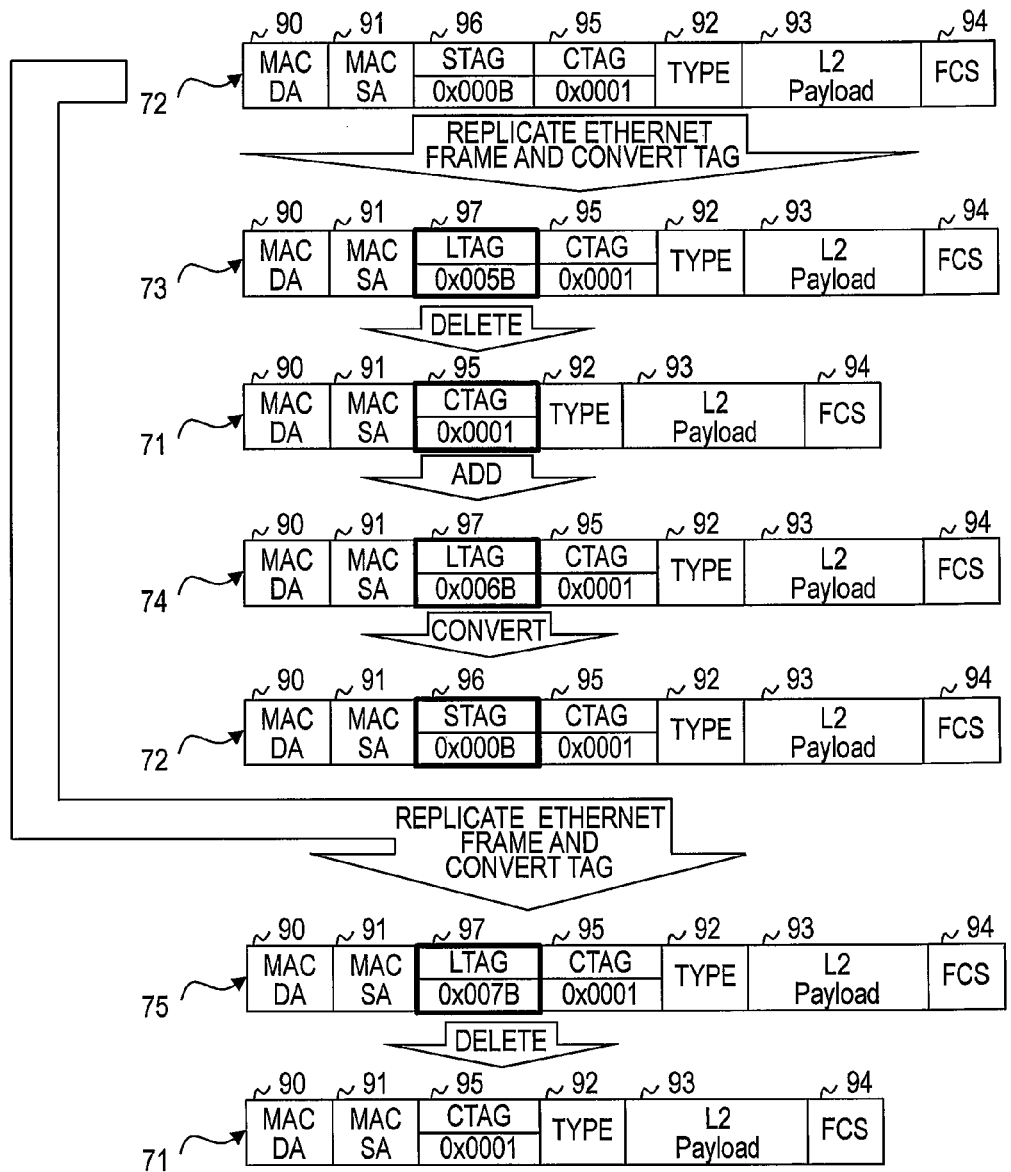
FIG. 14 is an explanatory diagram illustrating an Ethernet Frame replicated at tag conversion in Embodiment 1.

FIG. 14 is an explanatory diagram illustrating a specific example of an Ethernet Frame replicated at tag conversion in Embodiment 1.

The Ethernet Frame 72 in FIG. 14 includes, like the Ethernet Frame 82 shown in FIG. 4, a MAC DA 90, a MAC SA 91, an STAG 96, a CTAG 95, a TYPE 92, an L2 Payload 93, and an FCS 94. The VID 34 of the STAG 96 in FIG. 14 is 0x000B, which is an identifier for the VID 34 identifying Company B.

When the NP and chipset 410 in the line card 400-1 receives an Ethernet Frame 72 for extended VLAN tagged communication shown in FIG. 13 from the WAN 4, the tag conversion unit 417-1 refers to the conversion table 703 of FIG. 8 held in the volatile memory 412 (S551).

After S551, the tag conversion unit 417-1 determines that the Ethernet Frame 72 matches the entry 765 in the conversion table 703 (in which the IN TAG 40 indicates an STAG 96 having VID=0x000B and the IN PORT 41 indicates the WAN 4) (S552). After S552, the tag conversion unit 417-1 replicates the Ethernet Frame 72 into two Ethernet Frames in accordance with the entry 765 (S553) because the OUT TAG 50 of the entry 765 contains two values.

After S553, the tag conversion unit 417-1 converts the STAG 96 of one of the Ethernet Frames 72 to an LTAG 97 including a VID 34 of 0x005B. This conversion creates the Ethernet Frame 73 shown in FIG. 14.

Also, the tag conversion unit 417-1 converts the STAG 96 of the other Ethernet Frame 72 to an LTAG 97 including a VID 34 of 0x007B. This conversion creates the Ethernet Frame 75 shown in FIG. 14 (S554).

After S554, the tag conversion unit 417-1 sends the Ethernet Frames 73 and 75 to the internal switch 300 in accordance with the OUT PORT 51 of the entry 765 (S555).

Upon receipt of the Ethernet Frame 75, the internal switch 300 identifies that the destination associated with the input source of the Ethernet Frame 75 and the VNIC 153 of the virtual machine represented by the value 0x007B of the VID 34 in the LTAG 97 of the Ethernet Frame 75 is the information processing card 100 and transfers the Ethernet Frame 75 to the identified information processing card 100.

When the information processing card 100 receives the Ethernet Frame 75, the virtual switch 190 deletes the outermost VLAN tag to create the Ethernet Frame 71 and transfers the Ethernet Frame 71 to the VNIC 153 represented by the value 0x007B of the VID 34 of the deleted VLAN tag. In this phase, the Ethernet Frame 71 is in a format including only the CTAG 95.

In this way, the IDS service program 151 for Company B on the guest OS 152 of the virtual machine 150 can execute the IDS service on the Ethernet Frame 71 input from the VNIC 153.

The result of the processing by the IDS service program 151 for Company B is not sent to the LAN 5 in the form of an Ethernet Frame but stored in the virtual machine 150 (physically, the information processing card 100). Accordingly, the administrator may acquire the result of the processing by the IDS service program 151 for Company B via the VNIC 153 or a different VNIC port newly provided to acquire the result.

In the meanwhile, when the internal switch 300 receives the Ethernet Frame 73, the internal switch 300 identifies that the destination associated with the input source of the Ethernet Frame 73 and the VNIC of the virtual machine represented by the value 0x005B of the VID 34 in the LTAG 97 of the Ethernet Frame 73 is the information processing card 100 and transfers the Ethernet Frame 73 to the identified information processing card 100.

When the information processing card 100 receives the Ethernet Frame 73, the virtual switch 190 deletes the outermost VLAN tag to create an Ethernet Frame 71 and transfers the Ethernet Frame 71 to the VNIC 143 represented by the value 0x005B of the VID 34 of the deleted VLAN tag. In this phase, the Ethernet Frame 71 is in a format including only the CTAG 95.

In this way, the WAN optimization service program 141 for Company B on the guest OS 142 of the virtual machine 140 can execute the WAN optimization service for Company B on the Ethernet Frame 71 input from the VNIC 143.

If the WAN optimization service program 141 for Company B determines the Ethernet Frame 71 to go for the LAN, the Ethernet Frame 71 is sent from the VNIC 144 to the virtual switch 190. The virtual switch 190 adds an LTAG 97 representing the input source of the VNIC 144 (having a VIC 34 of 0x006B) to the Ethernet Frame 71 to create an Ethernet Frame 74 shown in FIG. 14. Then, the virtual switch 190 inputs the Ethernet Frame 74 to the chipset 111.

Upon receipt of the Ethernet Frame 74 (S550), the tag conversion unit 117 of the chipset 111 executes the processing of FIG. 10. However, at S552, the tag conversion unit 117 determines that there is no matching entry in the conversion table 703. Accordingly, the tag conversion unit 117 sends the Ethernet Frame 74 to the internal switch 300 in accordance with the forwarding table held in advance (S556).

Upon receipt of the Ethernet Frame 74, the internal switch 300 identifies that the destination associated with the information on the input source and the value 0x006B of the VID 34 in the LTAG 97 is the line card 400-2 and sends the Ethernet Frame 74 to the identified destination.

When the NP and chipset 410 of the line card 400-2 receives the Ethernet Frame 74 (S550), the tag conversion unit 417-2 starts the processing of FIG. 10. The tag conversion unit 417-2 determines that the Ethernet Frame 74 matches the entry 766 of the conversion table 703 (in which the IN TAG 40 contains an LTAG 97 having a VID 34=0x006B and the IN PORT 41 contains CARD#1 (information processing card 100)) (S552).

Since the OUT TAG 50 of the entry 766 contains a single value (S553), the tag conversion unit 417-2 converts the LTAG 97 of the Ethernet Frame 74 into an STAG 96 having a VID 34 of 0x000B in accordance with the entry 766. This conversion creates an Ethernet Frame 72.

The tag conversion unit 417-2 sends the Ethernet Frame 72 from the line card 400-2 to the LAN 5 in accordance with the OUTPUT PORT 51 of the entry 766 (S555).

Through the above-described processing, communication services can be applied to the virtual network service (a wide area Ethernet communication using extended VLAN tagging) for Company B.

Now, described hereinafter is a modified example of the processing illustrated in FIG. 11.

Figure 15:
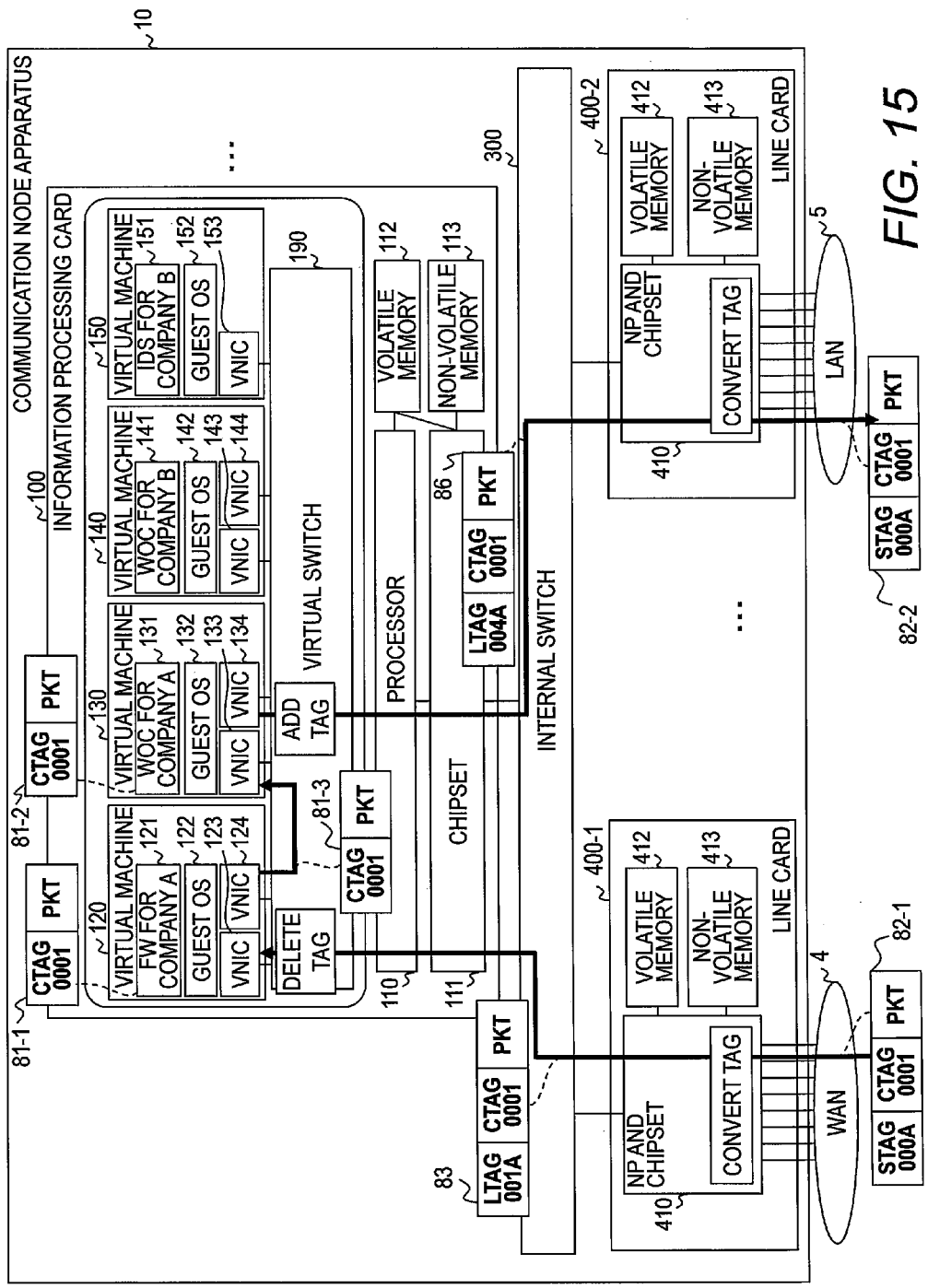
FIG. 15 is an explanatory diagram illustrating tag conversion in successively executing communication services in Embodiment 1.

FIG. 15 is an explanatory diagram illustrating tag conversion in successively executing communication services in Embodiment 1.

In the case where the same processor 110 of the same information processing card 100 successively executes a plurality of communication services like the communication services for Company A illustrated in FIG. 11 (the FW in the virtual machine 120 and the WOC in the virtual machine 130), the administrator may eliminate the processing for the virtual switch 190 to add an LTAG 97 between the two communication services (or the two virtual machines).

The administrator configures the virtual switch common to the two communication services so as to connect the output VNIC for a communication service with the input VNIC for the other communication service, so that Ethernet Frames which have been processed by one communication service (Ethernet Frames including only CTAGs 95) are directly sent to the virtual machine to execute the processing of the other communication service. As a result, the tag conversion by the tag conversion unit 117 is reduced to achieve speedy processing.

For example, the administrator may configure the virtual switch 190 so that Ethernet Frames will be transmitted only between the VNIC 124 for the firewall service program 121 for Company A and the VNIC 133 for the WAN optimization service program 131 for Company A as shown in FIG. 15. Since the tag conversion unit 117 does not add LTAGs 97, the two virtual machines use Ethernet Frames 81 including only CTAGs 95.

The processing illustrated in FIG. 15 can be implemented, for example, by configuring the virtual switch 190 so that the output of the VNIC 124 will be the input of the VNIC 133 and the output of the VNIC 133 will be the input of the VNIC 124 by the administrator. When this virtual switch 190 receives an Ethernet Frame from an interface such as the VNIC 124 or a physical NIC, it refers to the forwarding table held in the volatile memory 112 and transfers the Ethernet Frame or adds/deletes a VLAN tag. The other processing are the same as the processing illustrated in FIG. 11.

Figure 16:
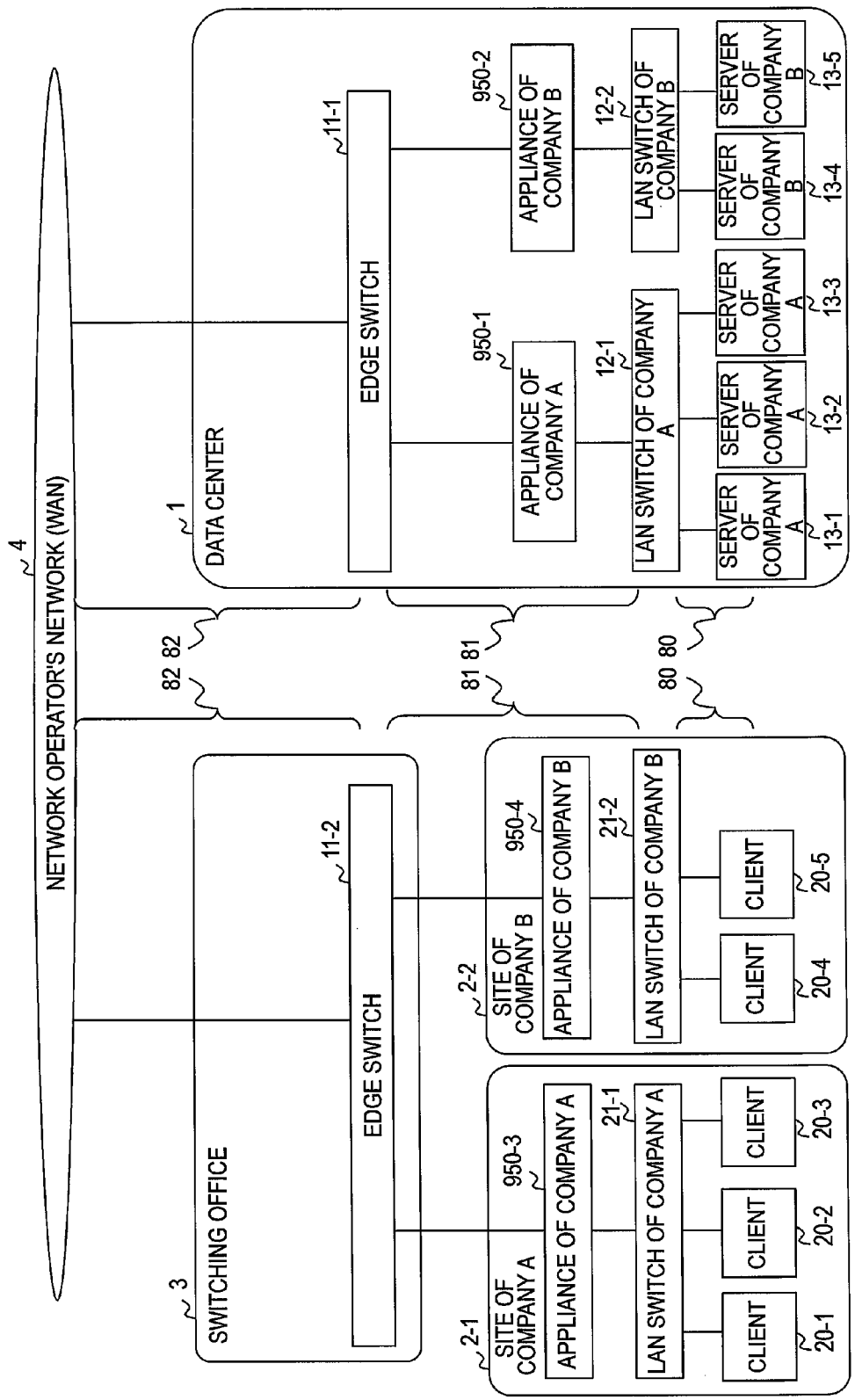
FIG. 16 is a block diagram illustrating a comparative example to the system configuration for providing communication services in Embodiment 1.

FIG. 16 illustrates a system configuration to be compared with the foregoing system of this embodiment.

FIG. 16 is a block diagram illustrating a comparative example to the system configuration for providing communication services in Embodiment 1.

The system configuration shown in FIG. 16 illustrates architecture for the network operator to provide communication services such as WAN optimization and firewall on a wide area Ethernet.

Differences between the system configuration of FIG. 1 and the system configuration of FIG. 16 are described as follows. The first difference is that the switching office 3 in FIG. 16 does not have the communication node apparatus 10-2 and the data center 1 does not have the communication node apparatus 10-1. The second difference is that independent appliances 950 (950-3, 950-4) for individual tenants (clients) are connected between the edge switch 11-2 and the clients' own LAN switches 21. The third difference is that independent appliances 950 (950-1, 950-2) for individual tenants (clients) are connected between the edge switch 11-1 and the clients' own LAN switches 12.

If the appliances 950 in FIG. 16 are provided by the network operator, each of Company A and Company B can use the communication services for the company in the wide area Ethernet provided by the network operator because the appliances 950 are independent between the tenants.

If the number of tenants (clients) provided with communication services is small, the network operator can provide tenant-specific communication services through the system configuration shown in FIG. 16. However, if the number of tenants is large, the system of FIG. 16 requires a large number of appliances 950, leading to increase in equipment cost and operation cost.

On the other hand, in the system configuration of Embodiment 1 shown in FIG. 1, the communication node apparatuses 10 (10-1, 10-2) include virtual machines for providing communication services; accordingly, the required number of communication node apparatuses 10 (corresponding to the appliances) can be small. Embodiment 1 enables the network operator to create the facility to provide communication services at a low cost.

As described above, the communication node apparatus 10 in Embodiment 1 enables a network including a plurality of virtual networks to provide different communication services to individual virtual networks by converting STAGs identifying tenants and the plurality of virtual networks such as VLANs into LTAGs for the processing in the communication node apparatus 10.

Furthermore, the network operator can achieve low equipment and operation cost by running the appliances for executing communication services on the virtual machines in the communication node apparatus 10 shared by the tenants.

Embodiment 2

The network system in Embodiment 2 is a system in which the communication node apparatus 10 in Embodiment 1 has been replaced by a system including a tag conversion apparatus, switches, and servers.

Figure 17:
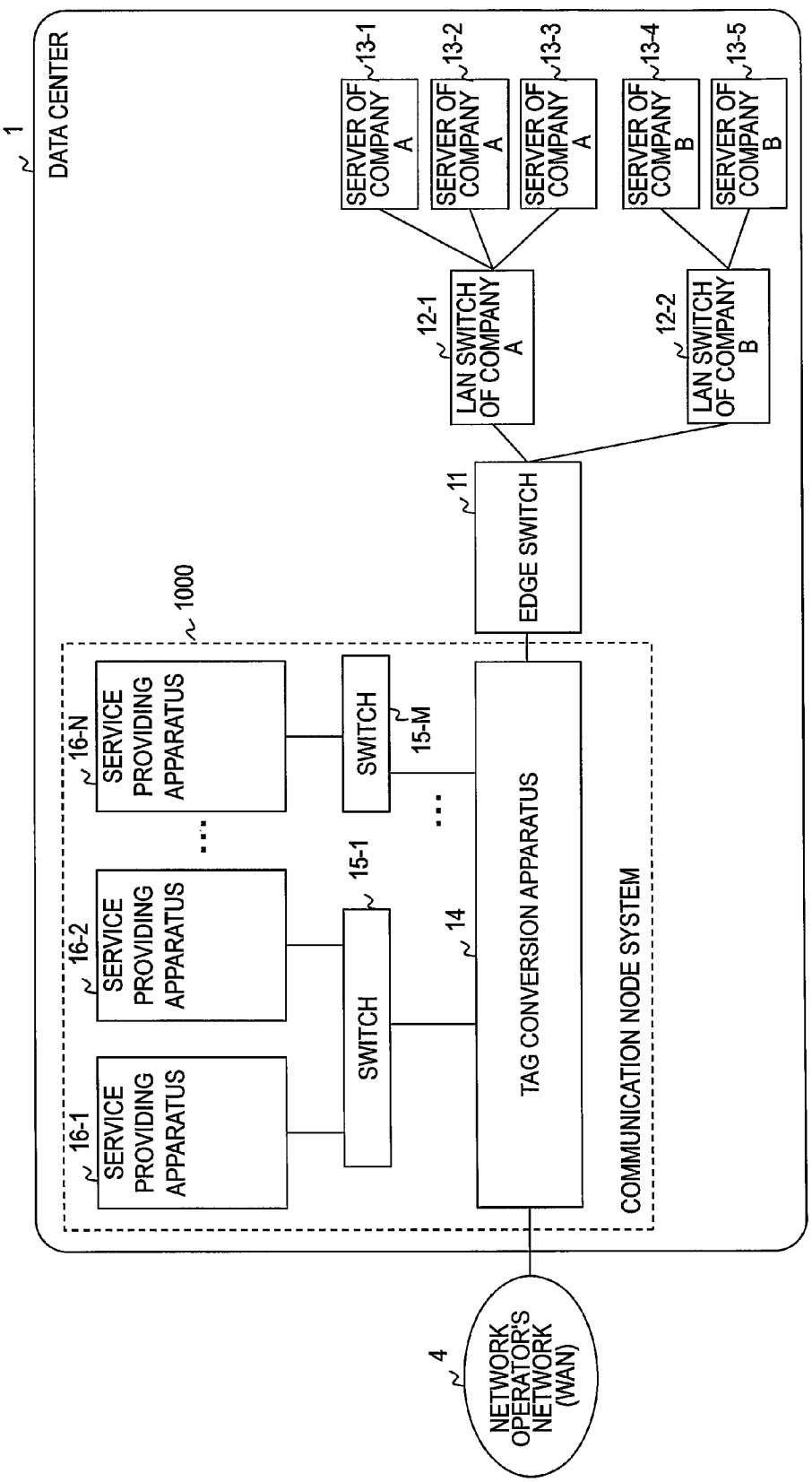
FIG. 17 is a block diagram illustrating a system for executing tag conversion in Embodiment 2.

FIG. 17 is a block diagram illustrating a system for performing tag conversion in Embodiment 2.

The network operator's network (WAN) 4 and the data center 1 shown in FIG. 17 respectively correspond to the WAN 4 and the data center 1 shown in FIG. 1. The data center 1 in FIG. 17 has a communication node system 1000 corresponding to the communication node apparatus 10 in FIG. 1.

The communication node system 1000 includes a tag conversion apparatus 14, a plurality of switches 15 (15-1 to 15-M, where M is any positive number), and a plurality of service providing apparatuses 16 (16-1 to 16-N, where N is any positive number).

The tag conversion apparatus 14 is provided between the WAN 4 and the edge switch 11 and intercepts Ethernet Frames for extended VLAN tagged communication transmitted through the tag conversion apparatus 14. If an intercepted Ethernet Frame is to receive a communication service, the tag conversion apparatus 14 converts the outermost VLAN tag of the Ethernet Frame from an STAG 96 to an LTAG 97. The tag conversion apparatus 14 then transfers the Ethernet Frame to the service providing apparatus 16 running the communication service to be applied via a switch 15.

The tag conversion apparatus 14 also examines an Ethernet Frame sent from a service providing apparatus 16 after application of a communication service, and if the Ethernet Frame needs to receive another communication service, the tag conversion apparatus 14 converts the LTAG 97 of the Ethernet Frame again to an LTAG representing the port of the communication service to be applied. The tag conversion apparatus 14 then transfers the Ethernet Frame to the service providing apparatus 16 running the communication service to be applied via a switch 15.

If the tag conversion apparatus 14 determines that the Ethernet Frame sent from the service providing apparatus 16 after application of the cloud service does not need to receive another communication service, the tag conversion apparatus 14 converts the LTAG 97 of the Ethernet Frame to the original STAG 96. Then, the tag conversion apparatus 14 transfers the Ethernet Frame to the WAN 4 or the edge switch 11.

Figure 18:
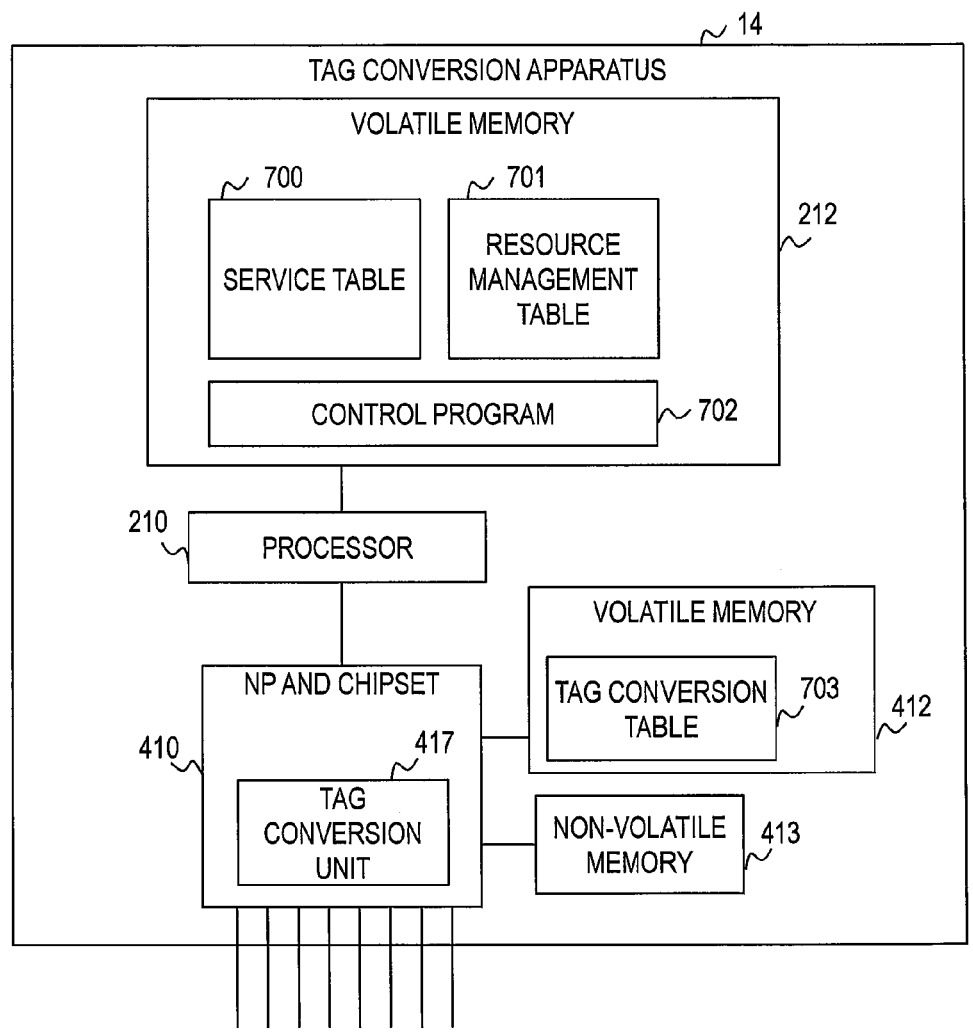
FIG. 18 is a block diagram illustrating a physical configuration of a tag conversion apparatus in Embodiment 2 and a logical configuration implemented by the physical configuration.

FIG. 18 is a block diagram illustrating a physical configuration of a tag conversion apparatus 14 in Embodiment 2 and a logical configuration implemented by the physical configuration;

The tag conversion apparatus 14 has the functions of the control card 200 and the line card 400 of the communication node apparatus 10 in FIG. 2. Specifically, the tag conversion apparatus 14 includes a processor 210, an NP and chipset 410, a volatile memory 212, a volatile memory 412, and a non-volatile memory 413.

The processor 210 is a computing device for executing programs deployed to the volatile memory 212 and may be a CPU. The volatile memory 212 holds a control program 702, a service table 700, and a resource management table 701.

The NP and chipset 410 performs processing on Ethernet Frames. The NP and chipset 410 includes a tag conversion unit 417. The tag conversion unit 417 performs the same processing as the processing illustrated in FIG. 10 in Embodiment 1.

The volatile memory 412 is a storage area for temporarily holding Ethernet Frames and storing table information such as a conversion table 703 and a forwarding table. The non-volatile memory 413 is a storage area for holding configuration information for the tag conversion apparatus 14.

The service table 700, the resource management table 701, and the conversion table 703 in Embodiment 2 are the same as the service table 700, the resource management table 701, and the conversion table 703 in Embodiment 1. The control program 702 in Embodiment 2 is also the same as the control program 702 in Embodiment 1.

Figure 19:
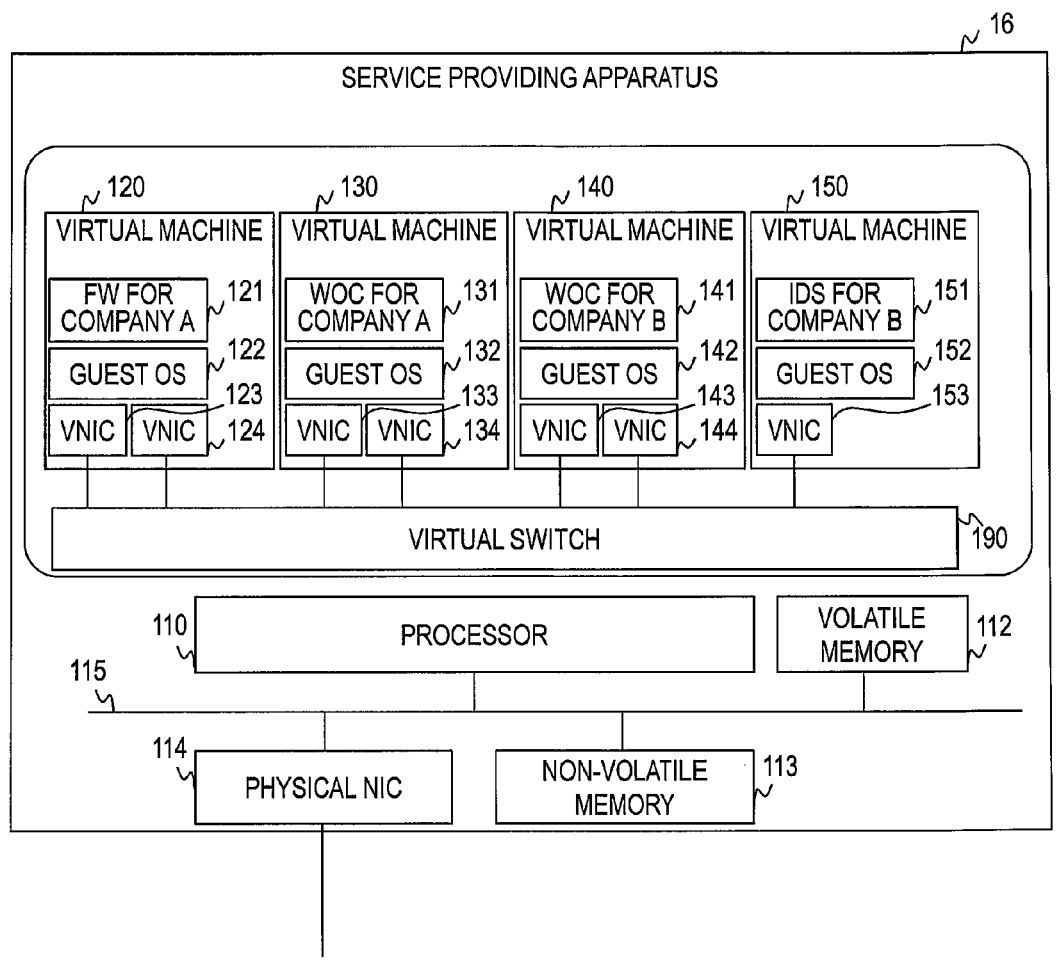
FIG. 19 is a block diagram illustrating a physical configuration of a service providing apparatus in Embodiment 2 and a logical configuration implemented by the physical configuration.

FIG. 19 is a block diagram illustrating a physical configuration of a service providing apparatus 16 in Embodiment 2 and a logical configuration implemented by the physical configuration.

The service providing apparatus 16 corresponds to the information processing card 100 in the communication node apparatus 10 shown in FIG. 2 and may be implemented with a general-purpose PC (Personal Computer) server. The service providing apparatus 16 includes a processor 110, a volatile memory 112, a physical NIC 114, and a non-volatile memory 113.

The processor 110 is a computing device for executing communication service programs and may be a CPU. The physical NIC (network interface) 114 sends and receive Ethernet Frames. The volatile memory 112 temporarily holds Ethernet Frames, holds table information and deployed programs. The non-volatile memory 113 is a storage area for holding configuration information, programs, and an OS.

The service providing apparatus 16 includes an internal bus 115 for connecting physical components included in the service providing apparatus 16.

The processor 110 and the volatile memory 112 of the service providing apparatus 16 implements a plurality of virtual machines and a virtual switch 190 for connecting the virtual machines with virtualization software in order to provide communication services to multiple tenants. The service providing apparatus 16 in FIG. 19 includes virtual machines 120, 130, 140, and 150 like the information processing card 100 in Embodiment 1.

FIG. 20 is an explanatory diagram illustrating a conversion table 703 in Embodiment 2.

The conversion table 703 of FIG. 20 is a table created based on the service table 700 in accordance with the processing illustrated in FIG. 9, like the conversion table 703 in Embodiment 1. The conversion table 703 in FIG. 20 includes entries 7031 to 7033.

The difference between the conversion table 703 in Embodiment 2 and the conversion table 703 in Embodiment 1 is that the IN PORTs 41 and the OUT PORTs 51 in the conversion table 703 in Embodiment 2 include values indicating switches 15.

Figure 21:
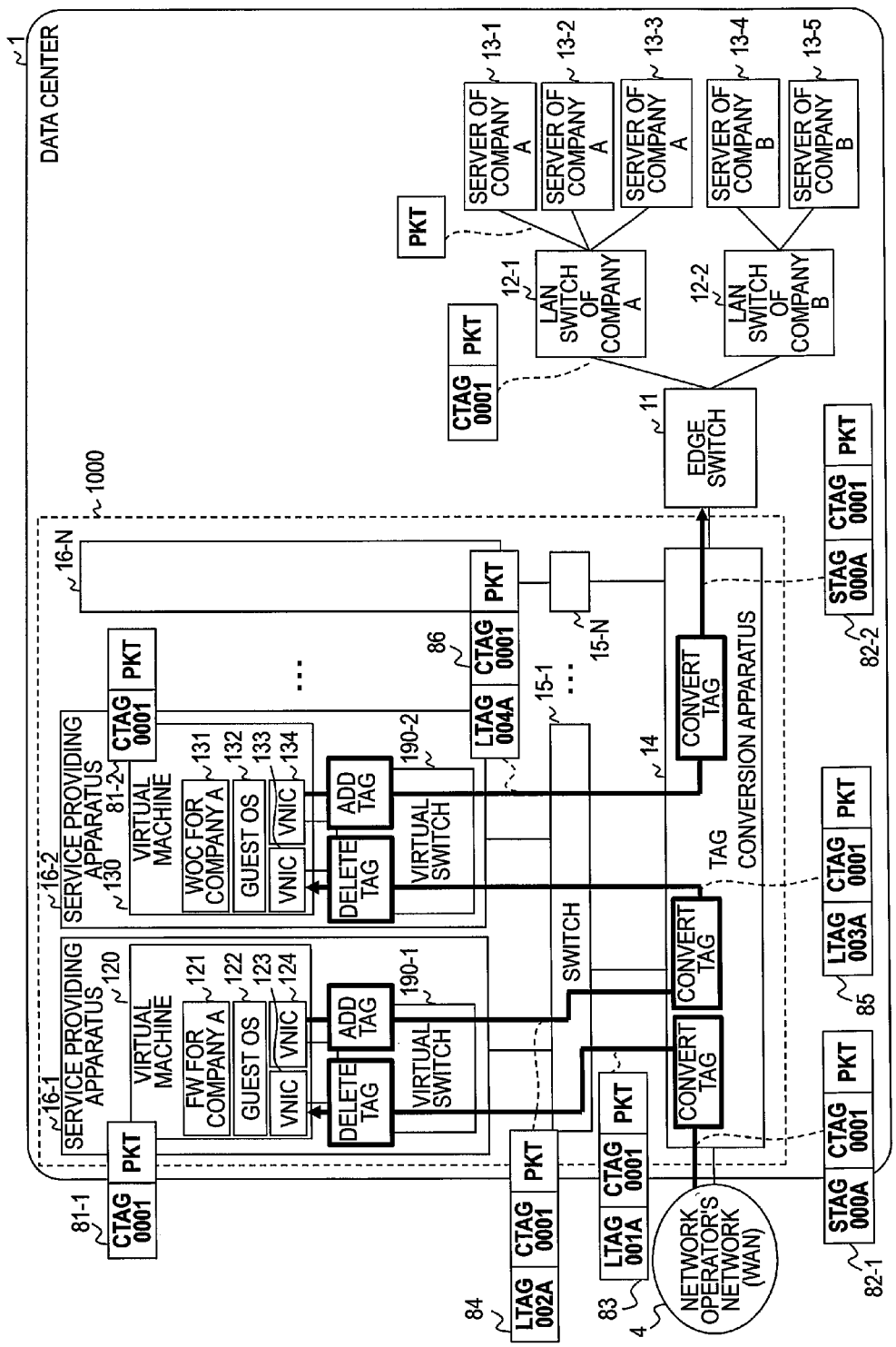
FIG. 21 is an explanatory diagram illustrating a specific example of tag conversion in Embodiment 2.

FIG. 21 is an explanatory diagram illustrating a specific example of tag conversion in Embodiment 2.

Illustrated in FIG. 21 is processing in the data center 1 in Embodiment 2 in the case where communication services of firewall (FW) and WAN optimization (WOC) are applied to the virtual network communication (wide area Ethernet communication using extended VLAN tagging) for Company A.

The tag conversion apparatus 14 in FIG. 21 receives an Ethernet Frame 82-1 from the WAN 4 and sends an Ethernet Frame 82-2 to the edge switch 11. In the communication node system 1000 in FIG. 21, the service providing apparatus 16-1 has a virtual machine 120 and the service providing apparatus 16-2 has a virtual machine 130.

The Ethernet Frame to be converted by the processing of FIG. 21 is the same as the Ethernet Frame shown in FIG. 12.

Upon receipt of an Ethernet Frame 82-1 with an STAG 96 including a VID 34 of 0x000A from a port of the WAN 4 (S550), the tag conversion unit 417 of the tag conversion apparatus 14 performs S551 to S555 illustrated in FIG. 10.

Specifically, in S551 to S554, the tag conversion unit 417 converts the STAG 96 of the Ethernet Frame 82-1 to an LTAG 97 including a VID 34 of 0x001A in accordance with the entry 7031 of the conversion table 703 of FIG. 20 to create an Ethernet Frame 83. At S555, the tag conversion unit 417 sends the Ethernet Frame 83 to the switch 15-1 in accordance with the value (SWITCH 15-1) indicated by the OUT PORT 51 of the entry 7031.

The switch 15-1 identifies the service providing apparatus 16-1 having the VNIC corresponding to the VID 34 of 0x001A in the LTAG 97 of the Ethernet Frame 83. The switch 15-1 then transfers the Ethernet Frame 83 to the identified service providing apparatus 16-1.

Upon receipt of the Ethernet Frame 83, the virtual switch 190-1 in the service providing apparatus 16-1 deletes the outermost VLAN tag (in this example, the LTAG 97) of the Ethernet Frame 83 to create the Ethernet Frame 81-1 shown in FIG. 21. The virtual switch 190-1 sends the Ethernet Frame 81-1 to the VNIC 123 of the virtual machine 120 to execute the firewall service program 121 for Company A based on the VID 34 of 0x001A of the deleted LTAG 97.

If the Ethernet Frame 81-1 can pass through the firewall service program 121 for Company A, the Ethernet Frame 81-1 is sent from the VNIC 124 to the virtual switch 190-1. The virtual switch 190-1 adds an LTAG 97 having a VID 34 of 0x002A representing the VNIC 124 to the Ethernet Frame 81-1 to create the Ethernet Frame 84 shown in FIG. 21.

The virtual switch 190-1 sends the Ethernet Frame 84 to the switch 15-1. The switch 15-1 transfers the Ethernet Frame 84 to the tag conversion apparatus 14. When the tag conversion apparatus 14 receives the Ethernet Frame 84 from the switch 15-1 (S550), the tag conversion unit 417 performs S551 to S555 illustrated in FIG. 10.

Specifically, in S551 to S554, the tag conversion unit 417 converts the LTAG 97 of the Ethernet Frame 84 to an LTAG 97 including a VID 34 of 0x003A in accordance with the entry 7032 of the conversion table 703 of FIG. 20 to create an Ethernet Frame 85. At S555, the tag conversion unit 417 sends the Ethernet Frame 85 to the switch 15-1 in accordance with the value (SWITCH 15-1) indicated by the OUT PORT 51 of the entry 7032.

The switch 15-1 identifies the service providing apparatus 16-2 for applying a communication service associated with the input source (tag conversion apparatus 14) and the VID 34 of 0x003A in the LTAG 97 and transfers the Ethernet Frame 85 to the identified service providing apparatus 16-2.

Upon receipt of the Ethernet Frame 85, the virtual switch 190-2 in the service providing apparatus 16-2 deletes the outermost VLAN tag (in this example, the LTAG 97) of the Ethernet Frame 85 to create the Ethernet Frame 81-2 shown in FIG. 21. The virtual switch 190-2 sends the Ethernet Frame 81-2 to the VNIC 133 of the virtual machine 130 to execute the WAN optimization service program 131 for Company A based on the VID 34 of 0x003A of the deleted LTAG 97.

If the Ethernet Frame 81-2 is determined to go for the LAN through the WAN optimization service program 131 for Company A, the Ethernet Frame 81-2 is sent from the VNIC 134 to the virtual switch 190-2. The virtual switch 190-2 adds an LTAG 97 having a VID 34 of 0x004A representing the VNIC 134 to the Ethernet Frame 81-2 to create the Ethernet Frame 86 shown in FIG. 21.

The virtual switch 190-2 sends the Ethernet Frame 86 to the switch 15-1. The switch 15-1 transfers the Ethernet Frame 86 to the tag conversion apparatus 14. When the tag conversion apparatus 14 receives the Ethernet Frame 86 from the switch 15-1 (S550), the tag conversion unit 417 performs S551 to S555 illustrated in FIG. 10.

Specifically, in S551 to S554, the tag conversion unit 417 converts the LTAG 97 of the Ethernet Frame 86 to an STAG 96 including a VID 34 of 0x000A in accordance with the entry 7033 of the conversion table 703 of FIG. 20 to create an Ethernet Frame 82-2. The tag conversion unit 417 sends the Ethernet Frame 82-2 to the LAN 5 (the edge switch 11) in accordance with the value (LAN) indicated by the OUT PORT 51 of the entry 7033.

Through the above-described operations, communication services can be applied to a virtual network service (a wide area Ethernet using extended VLAN tagging) for Company A. Since LTAGs are in the same format as usual VLAN tags, the system in Embodiment 2 can be configured with standard switches and PC servers.

In Embodiment 2, tag conversion is performed only in the tag conversion apparatus 14. The conversion table 703 is held only by the tag conversion apparatus 14. As a result, if service providing apparatuses 16 are located in remote sites, the network operator can provide communication services to virtual network services by managing only the tag conversion apparatus 14.

It should be noted that the communication node apparatus 10 in Embodiment 1 and the communication node system 1000 in Embodiment 2 may identify virtual networks by Ethernet Frames other than extended VLAN tagged Ethernet Frames. Hereinafter, examples employing Ethernet Frames other than extended VLAN tagged Ethernet Frames are described.

To achieve the wide area Ethernet explained in the foregoing embodiments, not only the extended VLAN tagging but also the technology of MAC-in-MAC defined by IEEE 802.1ah may be utilized. The MAC-in-MAC is a technology that makes communications while encapsulating an Ethernet Frame (MAC frame) in an Ethernet Frame (MAC frame).

There are two methods to utilize MAC-in-MAC. One method encapsulates an Ethernet Frame including an STAG and a CTAG for extended VLAN tagged communication in a MAC frame to encapsulate an Ethernet Frame in an Ethernet Frame (MAC frame). The other method encapsulates an Ethernet Frame including a CTAG in a MAC frame.

The MAC-in-MAC Ethernet Frame by the first method is received by the communication node apparatus 10 in Embodiment 1 or the communication node system 1000 in Embodiment 2 as an Ethernet Frame 82 for extended VLAN tagged communication. Accordingly, neither the communication node apparatus 10 in Embodiment 1 nor the communication node system 1000 in Embodiment 2 needs to regard the received Ethernet Frame as a MAC-in-MAC Ethernet Frame for special processing.

Figure 22:
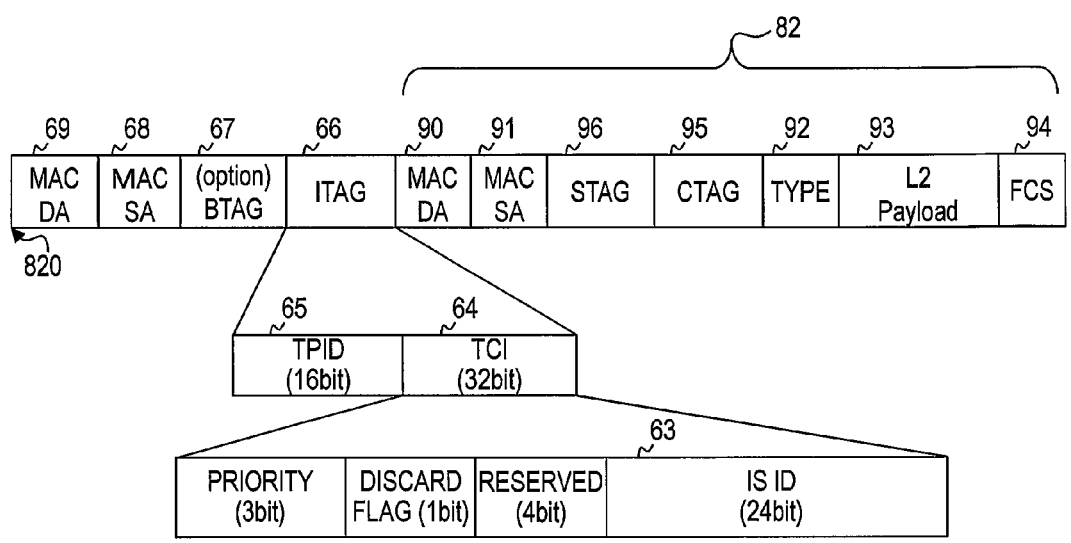
FIG. 22 is an explanatory diagram illustrating an Ethernet Frame for MAC in MAC in Embodiment 2.

The MAC-in-MAC Ethernet Frame by the second method is illustrated in FIG. 22.

FIG. 22 is an explanatory diagram illustrating an Ethernet Frame for MAC-in-MAC in Embodiment 2.

The MAC-in-MAC Ethernet Frame 820 by the second method includes an Ethernet Frame 82 and a header added to the outside of the Ethernet Frame 82. The header added to the outside of the Ethernet Frame 82 includes a MAC DA 69, a MAC SA 68, a BTAG 67, and an ITAG 66.

The ITAG 66 contains a 6-byte value for identifying a tenant. The 18-byte section consisting of the MAC DA 90 and MAC SA 91 of the Ethernet Frame 82 and the ITAG 66 may be defined as the ITAG. The ITAG 66 includes a 24-bit identifier called ISID (Service Instance ID); accordingly, the ITAG 66 can identify a larger number of tenants than an STAG including a 12-bit VID.

In the case of employing the MAC-in-MAC by the second method in this invention, the tag conversion unit 417 converts the ITAG 66 to an LTAG 97, instead of the STAG 96 of an Ethernet Frame 82. The control program 702 stores a value identifying the ITAG 66 in the service table 700 and the conversion table 703, instead of a value identifying the STAG 96.

The LTAG 97 created by converting the ITAG 66 may be in the same format as that of the ITAG 66 or in the same format as that of the VLAN tag in a BTAG 67 included as an option of the MAC-in-MAC.

Another modified example of this embodiment is a method that uses VXLAN discussed by IETF (Internet Engineering Task Force), instead of extended VLAN tagging for VLANs.

Figure 23:
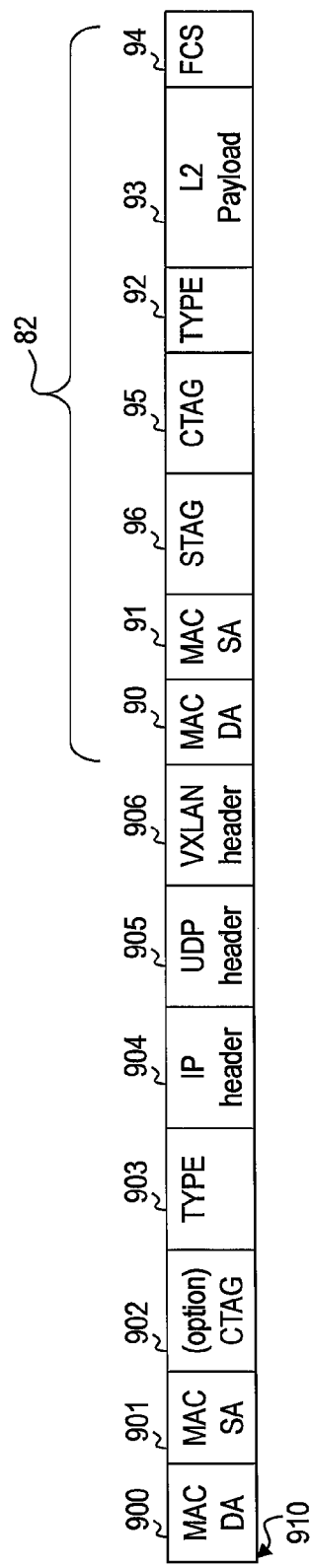
FIG. 23 is an explanatory diagram illustrating an Ethernet Frame for VXLAN in Embodiment 2.

FIG. 23 is an explanatory diagram illustrating an Ethernet Frame 910 for VXLAN in this embodiment.

The VXLAN is a technology that encapsulates an Ethernet Frame 82 in an Ethernet Frame for UDP/IP to make communications using the encapsulated Ethernet Frame. The Ethernet Frame for UDP/IP in the VXLAN includes an 8-byte VXLAN header 906 including a 24-bit identifier ahead of the payload.

The VXLAN is a technology discussed aiming to construct a large-scale multitenant cloud and to achieve transparent disaster recovery among a plurality of sites.

In the case of application of VXLAN to this embodiment, the tag conversion unit 417 converts the VXLAN header 906 instead of the STAG 96 of the Ethernet Frame to the LTAG 97. The control program 702 stores values of the VXLAN header 906 in the service table 700 and the conversion table 703, instead of the value of the STAG 96.

The LTAG 97 created by converting the VXLAN header 906 may be in the same format as that of the VXLAN header 906 or the same format as that of the CTAG 902 (same as the VLAN tag) specified for the VXLAN as an option.

As described above, in either case of using the MAC-in-MAC or the VXLAN, converting the identifier included in an Ethernet Frame into an LTAG and combining the identifier with a virtual machine to execute a communication service such as WAN optimization can be performed by the same methods used by the communication node apparatus 10 in Embodiment 1 or the communication node system 1000 in Embodiment 2.

Therefore, this embodiment is applicable to various schemes for specifying an Ethernet Frame format, providing a communication method that can be flexibly applied to various network systems.

The foregoing embodiments have described a method for a plurality of virtual machines in one information processing card 100 or one communication node system 1000 to successively execute communication services, a method for a plurality of virtual machines in one information processing card 100 or one communication node system 1000 to execute communication services in parallel. The described methods are the simplest examples; for example, the tag conversion unit 417 replicates an Ethernet Frame into multiple Ethernet Frames and then communication services may be successively executed on the replicated Ethernet Frames.

The foregoing embodiments convert a tag (corresponding to an STAG, CTAG, or ITAG) included in an Ethernet Frame for identifying a virtual network to a tag (corresponding to an LTAG) for identifying a communication port of a virtual machine providing a communication service and applies a communication service specific to the virtual network. Thereafter, the embodiments convert the identifier for identifying the communication service and the communication port to the original identifier for identifying the virtual network to send the Ethernet Frame. Accordingly, communication services can be provided using virtual machines in association with a wide area Ethernet service.

Furthermore, the required communication node apparatuses 10 or communication node systems 1000 are fewer than the total number of communication services; accordingly, the network operator can reduce the equipment and operation costs in providing the cloud services.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

The drawings shows control lines and information lines as considered necessary for explanations but do not show all control lines or information lines in the products. It can be considered that most of all components are actually interconnected.

This invention can be applied to a system for providing communication services to a plurality of companies.

What is claimed is:

1. A communication apparatus provided on a communication path between a server and a client sending and receiving Ethernet Frames through a physical network with each other, the server and the client being allocated a virtual network, each of the Ethernet Frames transmitted in the virtual network including a first identifier for identifying one of the virtual network, the communication apparatus comprising:

at least one processor connected to at least one memory which stores instructions that cause the at least one processor to execute, a transfer unit for obtaining the Ethernet Frames sent and received from the server or the client as a source thereof, an information processing unit for executing one or more communication services on the Ethernet Frames, and a tag conversion unit for converting the Ethernet Frames, wherein the information processing unit includes one or more virtual machines to execute the communication services on the Ethernet Frames, the communication services being specific to the virtual network transmitting the Ethernet Frames, wherein each of the virtual machines includes a respective first input/output port and a respective second input/output port, wherein the at least one memory stores conversion information including one or more second identifiers for identifying the respective first input/output port of which ones of the virtual machines execute the communication services on the Ethernet Frames transmitted in the virtual network identified by the first identifier, wherein, after a first one of the Ethernet Frames is obtained by the transfer unit, the tag conversion unit converts the first one of the Ethernet Frames into a second Ethernet Frame that includes one of the second identifiers based on the first identifier of the first one of the Ethernet Frames and the conversion information, and sends the second Ethernet Frame toward the respective first input/output port of a first one of the virtual machines identified by the one of the second identifiers, wherein, after the first one of the virtual machines has executed one of the communication services on the received second Ethernet Frame, the information processing unit converts the second Ethernet Frame on which the one of the communication services has been executed into a third Ethernet Frame including a third identifier identifying the respective second input/output port of the first one of the virtual machines which has executed the one of the communication services, wherein, after the third Ethernet Frame including the third identifier identifying the respective second input/output port of the first one of the virtual machines which has executed the one of the communication services is sent from the information processing unit, the tag conversion unit converts the third Ethernet Frame into the first one of the Ethernet Frames including the first identifier based on the third identifier and the conversion information receiving the third Ethernet Frame, and wherein the transfer unit sends the converted first one of the Ethernet Frames toward the server or the client as a destination thereof.

2. The communication apparatus according to claim 1, wherein the information processing unit includes a virtual switch which connects the respective first input/output port and the respective second input/output port of each of the one or more virtual machines to the tag conversion unit, and wherein the virtual switch transfers the second Ethernet Frame sent from the tag conversion unit to the first input/output port of the first virtual machine, and transfers the third Ethernet frame from the information processing unit to the tag conversion unit.

3. The communication apparatus according to claim 1, wherein, the conversion information includes a plurality of the second identifiers, and wherein the tag conversion unit replicates the first one of the Ethernet Frames into a plurality of first Ethernet Frames upon receipt of the first one of the Ethernet Frames, converts each of the replicated first Ethernet Frames into a plurality of second Ethernet Frames each including different ones of the plurality of second identifiers, and sends the second Ethernet Frames toward the respective first input/output port of the virtual machines identified by each of the different ones of the plurality of second identifiers.

4. The communication apparatus according to claim 3, wherein the information processing unit includes the first one of the virtual machines required to send the second Ethernet Frame after execution of the one of the communication services thereon and a second one of the virtual machines not required to send any Ethernet Frame after execution of the one of the communication services thereon, wherein the respective first input/output port of the first one of the virtual machines is identified by a first one of the second identifiers, and wherein the respective first input/output port of the first one of the virtual machines and the respective first input/output port of the second one of the virtual machines are identified by the different ones of the plurality of second identifiers.

5. The communication apparatus according to claim 1, wherein the virtual network is allocated to a group including a plurality of servers and a plurality of clients, wherein at least one second virtual network is allocated to at least one of the plurality of servers and at least one of the plurality of clients included in the group, wherein the first identifier includes an identifier for identifying one of the at least one first virtual network and an identifier for identifying one of the at least one second virtual network, and wherein the tag conversion unit acquires the first identifier from each of the Ethernet Frames by acquiring an identifier for identifying a first virtual network and an identifier for identifying a second virtual network included in the Ethernet Frame.

6. The communication apparatus according to claim 1,
wherein the first identifier is a value included in at least one predetermined header area of each of the Ethernet Frames, and
wherein the tag conversion unit acquires the first identifier by referring to the at least one predetermined area of each of the Ethernet Frames.

7. The communication apparatus according to claim 1,
wherein the at least one memory further stores instructions that cause the at least one processor to execute:
a control unit for creating the conversion information,
wherein the virtual network allocated to the server and the client is one virtual network among a plurality of virtual networks which connect to the communication apparatus, and the plurality of virtual networks sending and receiving Ethernet Frames which correspond to a plurality of different first identifiers,
wherein the at least one memory stores resource management information including candidates for identifiers to be held in the conversion information equal to a number of the first identifiers,
wherein the control unit assigns one or more second identifiers for each of the first identifiers based on the resource management information, and
wherein the control unit creates the conversion information including the assigned second identifiers for each of the virtual networks.

8. The communication apparatus according to claim 7,
wherein the resource management information includes allocated resources of the at least one processor and the at least one memory included in the information processing unit,
wherein the at least one memory stores service information indicating the communication services to be executed on the Ethernet Frames for each of the virtual networks,
wherein, when the control unit receives a request for to add another communication service to the communication services to be executed on the Ethernet frames for the virtual network, the control unit determines whether resources of the at least one processor and the at least one memory can be reserved for the one of the virtual machines for executing the other communication service which is requested to be added based on the resource management table and the request for addition,
wherein, when the resources of the at least one processor and the at least one memory can be reserved, the control unit configures a another one of the virtual machines for executing the other communication service which is requested to be added in the information processing unit based on the reserved resources of the at least one processor and the at least one memory and updates the service information and the resource management information, and
wherein, when the control unit receives a request for deletion of one of the communication services, the control unit updates the service information and the resource management information in accordance with the request for deletion and releases the allocated resources of the at least one processor and the at least one memory from the one of the virtual machines for executing the one of the communication services requested to be deleted.

9. The communication apparatus according to claim 1,
wherein the tag conversion unit converts the first one of the Ethernet Frames into the second Ethernet Frame by inserting the one of the second identifiers ahead of and adjacent to the first identifier included in the first one of the Ethernet Frames, and
wherein the tag conversion unit converts the third Ethernet Frame into the first one of the Ethernet Frames by deleting the third identifier included in the third Ethernet Frame.

10. The communication apparatus according to claim 1,
wherein the first identifier is included in an anterior VLAN tag of two VLAN tags included in each of the Ethernet Frames.

11. The communication apparatus according to claim 1,
wherein the first identifier is included in an anterior tag in a MAC-in-MAC header included in each of the Ethernet Frames.

12. The communication apparatus according to claim 1,
wherein the first identifier is included in a VXLAN included in each of the Ethernet Frames.

13. A communication system comprising:
a server and a client sending and receiving Ethernet Frames through a physical network with each other; and
a communication apparatus provided on a communication path between the server and the client,
wherein the server and the client are allocated a virtual network,
wherein each of the Ethernet Frames transmitted in the virtual network includes a first identifier for identifying the virtual network,
wherein the communication apparatus includes at least one processor connected to at least one memory which stores instructions that cause the at least one processor to execute:
a transfer unit for obtaining the Ethernet Frames sent and received from the server or the client as a source thereof,
an information processing unit for executing one or more communication services on the Ethernet Frames, and
a tag conversion unit for converting the Ethernet Frames,
wherein the information processing unit includes one or more virtual machines to execute the one or more communication services on the Ethernet Frames, the communication services being specific to the virtual network transmitting the Ethernet Frames,
wherein each of the virtual machines includes a respective first input/output port and a respective second input/output port,
wherein the at least one memory stores conversion information including one or more second identifiers for identifying the first respective input/output port of which ones of the virtual machines execute the communication services on the Ethernet Frames transmitted in the virtual network identified by the first identifier,
wherein, after a first one of the Ethernet Frames is obtained by the transfer unit, the tag conversion unit converts the first one of the Ethernet Frames into a second Ethernet Frame that includes one of the second identifiers based on the first identifier of the first one of the Ethernet Frames and the conversion information, and sends the second Ethernet Frame toward the respective first input/output port of a first one of the virtual machines identified by the one of the second identifiers,
wherein, after the first one of the virtual machines has executed one of the communication services on the received second Ethernet Frame the information processing unit converts the second Ethernet Frame on which the one of the communication services has been executed into a third Ethernet Frame including a third identifier identifying the respective second input/output port of the first one of the virtual machines which has executed the one of the communication services, wherein, after the third Ethernet Frame including the third identifier identifying the respective second input/output port of the first one of the virtual machines which has executed the one of the communication services is sent from the information processing unit, the tag conversion unit converts the third Ethernet Frame into the first one of the Ethernet Frames including the first identifier based on the third identifier and the conversion information upon receiving the third Ethernet Frame, and wherein the transfer unit sends the converted first one of the Ethernet Frames toward the server or the client as a destination thereof.

14. A communication method for a communication apparatus provided on a communication path between a server and a client sending and receiving Ethernet Frames through a physical network with each other, the server and the client being allocated at least one a virtual network, each of the Ethernet Frames transmitted in the virtual network including a first identifier for identifying the virtual network, the communication apparatus including at least one processor and at least one memory, and the communication method comprising:

providing, by the at least one processor and the at least one memory, an information processing unit including one or more virtual machines to execute the communication services on the Ethernet Frames, where the communication services are specific to the virtual network transmitting the Ethernet Frames, where each of the virtual machines includes a respective first input/output port and a respective second input/output port, and where the memory stores conversion information including one or more second identifiers for identifying the respective first input/output port of which ones of the virtual machines execute the communication services on the Ethernet Frames transmitted in the virtual network identified by the first identifier;

obtaining, by the at least one processor, the Ethernet Frames sent and received from the server or the client as a source thereof;

after a first one of the Ethernet Frames is obtained by the transfer unit, converting, by the at least one processor, the first one of the Ethernet Frames into a second Ethernet Frame that includes one of the second identifiers based on the first identifier of the first one of the Ethernet Frames and the conversion information, and sends the second Ethernet Frame toward the respective first input/output port of a first one of the virtual machines identified by the one of the second identifiers, executing, by the first one of the virtual machines, the one of the communication services on the second Ethernet Frame;

after the first one of the virtual machines has executed one of the communication services on the received second Ethernet Frame, the information processing unit converts the second Ethernet Frame on which the one of the communication services has been executed into a third Ethernet Frame including a third identifier identifying the respective second input/output port of the first one of the virtual machines which has executed the one of the communication services;

after the third Ethernet Frame including the third identifier identifying the respective second input/output port of the first one of the virtual machines which has executed the one of the communication services is sent from the information processing unit, converting, by the at least one processor, the third Ethernet Frame into the first one of the Ethernet Frames including the first identifier based on the third identifier and the conversion information upon receiving the third Ethernet Frame; and sending the converted first one of the Ethernet Frames toward the server or the client as a destination thereof.

15. A communication apparatus provided on a communication path between a server and a client sending and receiving Ethernet Frames through a physical network with each other, the server and the client being allocated a virtual network, each of the Ethernet Frames transmitted in the virtual network including a first identifier for identifying the virtual network, the communication apparatus comprising:

at least one processor connected to at least one memory which stores instructions that cause the at least one processor to execute:

a transfer unit for receiving the Ethernet Frames from the server or the client as a source thereof, an information processing unit including a virtual machine for executing a communication service, the communication service being specific the virtual network transmitting the Ethernet Frames and the virtual machine including a first input/output port and a second input/output port;

a tag conversion unit for converting a first one of the Ethernet Frames including the first identifier into a second Ethernet Frame including a second identifier identifying the first input/output port of the virtual machine executing the communication service on the first one of the Ethernet Frames, and sends the second Ethernet Frame toward the first input/output port identified by the second identifier, wherein the information processing unit converts the second Ethernet Frame on which the communication service has been executed by the virtual machine into a third Ethernet Frame including a third identifier identifying the second input/output port of the virtual machine which has executed the communication service, wherein the tag conversion unit converts the third Ethernet Frame including the third identifier into the first one of the Ethernet Frames including the first identifier, and wherein the transfer unit sends the converted first one of the Ethernet Frames on which the communication service has been executed toward the server or the client as a destination thereof.

16. A communication system comprising:

a server and a client sending and receiving Ethernet Frames through a physical network with each other; and a communication apparatus provided on a communication path between the server and the client, wherein the server and the client are allocated a virtual network, wherein each of the Ethernet Frames includes a first identifier for identifying one of the at least one the virtual network, wherein the communication system includes at least one processor connected to at least one memory which stores instructions that cause the at least one processor to execute:

a transfer unit for receiving the Ethernet Frames from the server or the client as a source thereof, an information processing unit including a virtual machine for executing a communication service, the communication service being specific the virtual network transmitting the Ethernet Frames and the virtual machine including a first input/output port and a second input/output port, and a tag conversion unit for converting a first one of the Ethernet Frames including the first identifier into a second Ethernet Frame including a second identifier identifying the first input/output port of the virtual machine executing the communication service on the first one of the Ethernet Frames, and sends the second Ethernet Frame toward the first input/output port identified by the second identifier, wherein the information processing unit converts the second Ethernet Frame on which the communication service has been executed by the virtual machine into a third Ethernet Frame including a third identifier identifying the second input/output port of the virtual machine which has executed the communication service, wherein the tag conversion unit converts the third Ethernet Frame including the third identifier into the first one of the Ethernet Frames including the first identifier, and wherein the transfer unit sends the converted first one of the Ethernet Frames on which the communication service has been executed toward the server or the client as a destination thereof.

17. At least one non-transitory computer readable storage medium storing instructions that, when executed on at least one processor of a communication apparatus, cause the at least one processor of the communication apparatus to perform processing, where the communication apparatus being is provided on a communication path between a server and a client for sending and receiving Ethernet Frames through a physical network with each other, where the server and the client being allocated a virtual network, and where each of the Ethernet Frames including a first identifier for identifying the virtual network, the processing comprising:

receiving the Ethernet Frames from the server or the client as a source thereof;

providing an information processing unit including a virtual machine for executing a communication service by a virtual machine, the communication service being specific to the virtual network transmitting the Ethernet Frames and the virtual machine including a first input/output port and a second input/output port;

converting a first one of the Ethernet Frames including the first identifier into a second Ethernet Frame including a second identifier identifying the first input/output port of the virtual machine executing the communication service on the first one of the Ethernet Frames, and sending the second Ethernet Frame toward the first input/output port identified by the second identifier;

executing the communication service on the second Ethernet Frame with the virtual machine;

converting the second Ethernet Frame on which the communication service has been executed by the virtual machine into a third Ethernet Frame including a third identifier identifying the second input/output port of the virtual machine which has executed the communication service;

converting the third Ethernet Frame including the third identifier into the first one of the Ethernet Frames including the first identifier; and sending the converted first one of the Ethernet Frames on which the communication service has been executed toward the server or the client as a destination thereof.

18. A communication apparatus provided on a communication path between a server and a client for sending and receiving Ethernet Frames through a physical network with each other, the server and the client being allocated a virtual network, each of the Ethernet Frames transmitted in the virtual network including a first identifier for identifying the virtual network, the communication apparatus comprising:

at least one processor connected to at least one memory which stores instructions that cause the at least one processor to execute:

a transfer unit for obtaining the Ethernet Frames sent and received between the server and the client, an information processing unit for executing one or more communication services on the Ethernet Frames, and a tag conversion unit for converting the Ethernet Frames, wherein the information processing unit includes one or more virtual machines to execute the communication services on the Ethernet Frames, the communication services being specific to the virtual network transmitting the Ethernet Frames, wherein each of the virtual machines includes a respective first input/output port and a respective second input/output port, wherein the at least one memory stores conversion information including one or more second identifiers for identifying the respective first input/output port of which ones of the virtual machines execute the communication services on the Ethernet Frames, wherein, after a first one of the Ethernet Frames is obtained by the transfer unit, the tag conversion unit converts the first one of the Ethernet Frames into a second Ethernet Frame that includes a first one of the second identifiers based on the first identifier of the first one of the Ethernet Frames and the conversion information, and sends the second Ethernet Frame toward the respective first input/output port of a first one of the virtual machines identified by the first one of the second identifiers, wherein, after the first one of the virtual machines has executed a first one of the communication services on the received second Ethernet Frame, the information processing unit converts the second Ethernet Frame on which the first one of the communication services has been executed into a third Ethernet Frame including a third identifier identifying the respective second input/output port of the first one of the virtual machines which has executed the first one of the communication services, wherein, after the third Ethernet Frame including the third identifier is obtained by the tag conversion unit, the tag conversion unit converts the third Ethernet Frame into a fourth Ethernet frame that includes a second one of the second identifiers based on the third identifier of the third Ethernet Frame and the conversion information, and sends the fourth Ethernet Frame toward the respective input/output port of a second one of the virtual machines identified by the second one of the second identifiers, wherein, after the second one of the virtual machines has executed a second one of the communication services on the received fourth Ethernet Frame, the information processing unit converts the fourth Ethernet Frame on which the second one of the communication services has been executed into a fifth Ethernet Frame including a fourth identifier identifying the respective second input/output port of the second one of the virtual machines which has executed the second one of the communication services, wherein, after the fifth Ethernet Frame including the fourth identifier identifying the respective second input/output port of the second one of the virtual machines which has executed the second one of the communication services is sent from the information processing unit, the tag conversion unit converts the fifth Ethernet Frame into the first one of the Ethernet Frames including the first identifier based on the fourth identifier and the conversion information upon receiving the fifth Ethernet Frame, and wherein the transfer unit sends the converted first one of the Ethernet Frames toward the server or the client as a destination thereof.

* * * * *